US011900407B1

United States Patent
Kalra et al.

(10) Patent No.: US 11,900,407 B1
(45) Date of Patent: Feb. 13, 2024

(54) COMPUTER-BASED SYSTEMS INVOLVING MACHINE LEARNING ASSOCIATED WITH GENERATION OF RECOMMENDED CONTENT AND METHODS OF USE THEREOF

(71) Applicant: Capital One Services, LLC, McLean, VA (US)

(72) Inventors: Jagdeep Kalra, Herndon, VA (US); Kamalesh Jayaraman, Fairfax, VA (US); David Tobey, Brooklyn, NY (US)

(73) Assignee: Capital One Services, LLC, McLean, VA (US)

(*) Notice: Subject to any disclaimer, the term of this patent is extended or adjusted under 35 U.S.C. 154(b) by 358 days.

(21) Appl. No.: 17/245,742

(22) Filed: Apr. 30, 2021

(51) Int. Cl.
*G06Q 30/0211* (2023.01)
*G06F 40/30* (2020.01)
*G06N 20/00* (2019.01)

(52) U.S. Cl.
CPC ........ *G06Q 30/0211* (2013.01); *G06F 40/30* (2020.01); *G06N 20/00* (2019.01)

(58) Field of Classification Search
CPC ..... G06Q 30/0211; G06F 40/30; G06N 20/00
See application file for complete search history.

(56) References Cited

U.S. PATENT DOCUMENTS

| | | | | |
|---|---|---|---|---|
| 11,012,749 | B2* | 5/2021 | Kimble | H04N 21/25891 |
| 11,516,158 | B1* | 11/2022 | Luzhnica | G06F 40/30 |
| 2014/0129331 | A1* | 5/2014 | Spivack | G06Q 30/0255 705/14.53 |
| 2016/0071162 | A1 | 3/2016 | Ogawa et al. | |
| 2019/0034976 | A1* | 1/2019 | Hamedi | G06Q 30/0243 |
| 2020/0034887 | A1 | 1/2020 | Hamedi et al. | |
| 2020/0320571 | A1* | 10/2020 | Singh | G06N 20/00 |
| 2021/0097240 | A1 | 4/2021 | Singh | |
| 2022/0405805 | A1* | 12/2022 | Khoury | G06Q 30/0264 |
| 2023/0230129 | A1* | 7/2023 | Khoury | G06N 20/00 705/14.61 |

OTHER PUBLICATIONS

International Search Report, Written Opinion and Notification thereof, in counterpart Int'l application No. PCT/US2022/027174, dated Aug. 18, 2022; 12 pages total.

* cited by examiner

*Primary Examiner* — Dylan C White
(74) *Attorney, Agent, or Firm* — Greenberg Traurig, LLP

(57) ABSTRACT

Systems and methods associated with providing content personalization are disclosed. In one embodiment, an exemplary method may comprise receiving first data including content preferences associated with an audience, receiving second data including an initial digital message being proposed for transmission to the audience, generating a recommendation data set based at least in part on the first data and the second data, wherein the recommendation data set identifies at least one recommended content type and at least one recommended message type, determining via a natural language generation machine learning model suggested content for the audience, and providing the suggested content for dissemination to the audience.

20 Claims, 20 Drawing Sheets

Content Personalization-SL/Banner/Intro

| | 950 | | | | | | | 954 |
|---|---|---|---|---|---|---|---|---|
| Select A Language [English ▾] | | | | | | | | Analyze |

Jagdeep, earn 10X miles with yours wells fargo card — 952

953

| Happy | Angry | Excited | Sarcasm | Sad | Fear | Bored |
|---|---|---|---|---|---|---|
| 17.42% | 9.10% | 30.50% | 17.95% | 5.51% | 16.56% | 2.96% |

960

| Select A Language [English ▾] | | | | | | | Analyze |
|---|---|---|---|---|---|---|---|

Jagdeep, don't miss out on 10X miles

963 — 962

| Happy | Angry | Excited | Sarcasm | Sad | Fear | Bored |
|---|---|---|---|---|---|---|
| 26.84% | 12.96% | 22.35% | 11.80% | 4.49% | 13.82% | 7.84% |

FIG. 9B

COMPUTER-BASED SYSTEMS INVOLVING MACHINE LEARNING ASSOCIATED WITH GENERATION OF RECOMMENDED CONTENT AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing components and devices and/or improved computing methods configured for one or more novel technological applications involving an engine comprising features and functionality for content personalization.

BACKGROUND OF TECHNOLOGY

A computer network platform or system may include a group of computers (e.g., clients, servers, smart routers, etc.) and other computing hardware devices that are linked together through one or more communication channels to facilitate communication, account management, marketing campaigns, and/or customer services. For example, a computer network platform or system may provide a customer at a client device with various service, content and information communicated from a service and/or product provider (e.g., FSP) at a server system, over the one or more communication channels including, for instance, emails, SMS, telephonic calls, social media messages, push messages, display of banner at a web browser of the customer, and the like. Conventionally, due to circumstances such as the mass volume of the number of customers, the service/product provider oftentimes is not able to customize its communication to the customers. As a result, the customers receive content and information that is not relevant, e.g., not personalized or contextualized to the individual recipient customer's needs and preferences.

OVERVIEW OF DESCRIBED SUBJECT MATTER

In some embodiments, the present disclosure provides various exemplary technically improved computer-implemented methods including steps such as:
 receiving, by at least one computer, first data comprising content preferences associated with an audience;
 receiving, by the at least one computer, second data comprising an initial digital message being proposed for transmission to the audience;
 generating, by the at least one computer, a recommendation data set based at least in part on the first data and the second data, wherein the recommendation data set identifies at least one recommended content type and at least one recommended message type;
 determining, by the at least one computer, via a natural language generation (NLG) machine learning model, suggested content for the audience, e.g., via:
  analyzing a repository of content messages associated with a plurality of sentiments based at least in part on the recommended data set to identify one or more correlations between the recommended data set and one or more content messages, wherein the repository of content messages are categorized into a plurality of message sentiment categories based on scored conversion events associated with the plurality of sentiments; and
  generating the suggested content based on the one or more correlations, wherein the suggested content comprises one or more suggested content messages having one or both of a suggested message type and a suggested message language; and
 providing, by the at least one computer, via an application program interface (API), the suggested content for dissemination to the audience.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 9A-9B are diagrams illustrating exemplary aspects associated with content personalization of subject lines, banners and introductory material, consistent with exemplary aspects of certain embodiments of the present disclosure.

DETAILED DESCRIPTION

Figure 1:
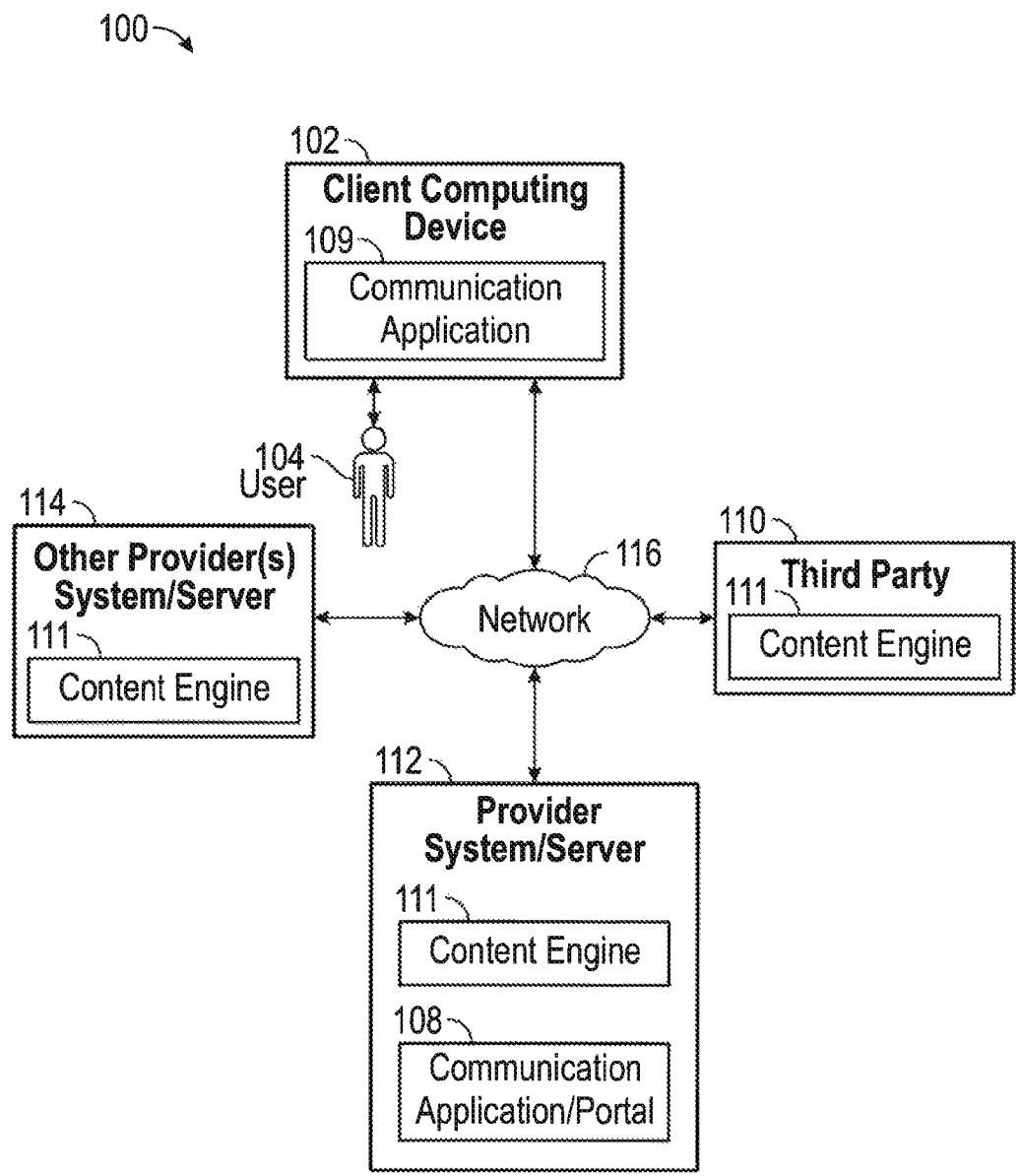
FIG. 1 is a block diagram of an exemplary system and/or platform involving features of content recommendation, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Aspects of the present innovations relate to content recommendation involving content analyzation and audience prediction that enables a provider (e.g., a content provider, a service provider, product provider, etc.) to enhance its customer relations with relevant and engaging communications that are personalized and contextualized in highly-improved technical ways based on an individual customer's needs and preferences as well as other salient data. According to the technical solutions disclosed herein, which enable delivery of communications that are more personally relevant and engaging, a provider may improve its performance and productivity in various ways such as by achieving higher customer satisfaction, by providing more efficient and/or effective marketing campaigns, by securing higher customer conversion rates and/or higher customer loyalty, and otherwise achieving higher revenue and profits resulting from such improvements. An overview of various exemplary workflow that enables content recommendation consistent with the disclosed technology is set forth, below.

Further, aspects of the innovations herein may involve various technical solutions required for content analyzing and audience preference prediction in aspects such as collecting user persona data/user context data, curating user personal data/context data, generating and/or training machine learning models for content analyzation and audience predication, utilizing cross-opportunity models encompassing the intelligence gleaned from individual models, generating recommendation datasets, as well as generating and/or training natural language generation (NLG) models for content recommendation.

Turning to an exemplary workflow of a provider who wishes to send an intelligent and impactful message to a customer, the provider may employ a content recommendation engine to verify, and/or generate personalized content for transmission to the customer. The content recommendation engine may in turn employ a content analyzer for analyzing content related to the recommendation of the content for communication to the customer, and a content preference predictor for determining the customer preferences including the likelihood of that the message to engage the customer.

FIG. 1 is a block diagram of an exemplary system and/or platform 100 involving features of content recommendation, consistent with exemplary aspects of certain embodiments of the present disclosure. System 100 may be configured for executing one or more software applications, such as a communication application/portal 108 for receiving and transmitting messages (e.g., emails, telephonic calls, SMS, social media messages, etc.), and a content recommendation engine 111, consistent with disclosed embodiments. As shown, system 100 may include a computing device 102, such as a client computing device, associated with a user 104. Computing device 102 may be configured to execute, among other programs, a communication application 109, which may be stand-alone or it may be provided by and/or associated with other computing resources, such as communication application/portal 108. System 100 may further include: (i) a third-party system/server 110 such as an entity that provides a content engine 111 for content recommendations herein; (ii) a provider system/server, such as a financial service provider (FSP) system that may provide or employ a content recommendation engine 111, and, optionally, (iii) at least one other provider system/server 114, such as a system or server that may provide another content engine 111 utilized by the system 100. As shown, computing device 102, third party computer or system 110, provider system or server 112, and at least one other provider system/server 114, may be communicatively coupled by a network 116.

While only one computing device 102, provider system or server 112, other provider system or server 114, third party computer or system 110, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing the communication application 109 and/or communication application/portal 108.

Communication application/portal 108 may be one or more software applications configured to perform operations consistent with providing communication in various forms to the customer, accessing the portal (via app, online or other network), as set forth herein, as well as interacting with the communication application 109, and the like. Here, for example, communication application 108 may be configured to provide various information and processing, associated with processing communications among the user 104, the provider system or server 112, the third party computer 110, and/or the other provider system/server 114. Such processing may occur by or with a communication application 108, locally, or the communication application 108 may transmit requests to and/or operate with one or more other software applications and/or computing components to process the desired information. Communication application 108 may also be hosted and/or operated, in whole or in part, by a network/communication system and/or server, described below in connection with FIG. 2.

Content recommendation engine 111 may be one or more software applications, modules, routines, subroutines and/or extensions configured to perform operations consistent with providing content recommendation for the use of the communication application 109, such as the features and functionality associated with the content recommendation shown and discussed further in connection with FIGS. 8-15.

Third party system 110 may be operated to provide the content personalization service as a third-party provider (e.g., software as a service, etc.). However, the content recommendation engine 111 may also be provided internally by an entity wishing to provide personalized content to customers, such as by the provider system or server 112 and/or by one or more of the other provider(s) system or server 114.

Other provider system or server 114 may be one or more computing devices configured to perform operations consistent with providing a content recommendation engine 111 to its customers including features and functionality accessible by computing device 102 over network 116. For example, various communication channels may be provided at computing device 102 via the communication application 108. The disclosed embodiments are not limited to any particular configuration of other provider system/server 114.

Provider system or server 112, in one example embodiment, may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
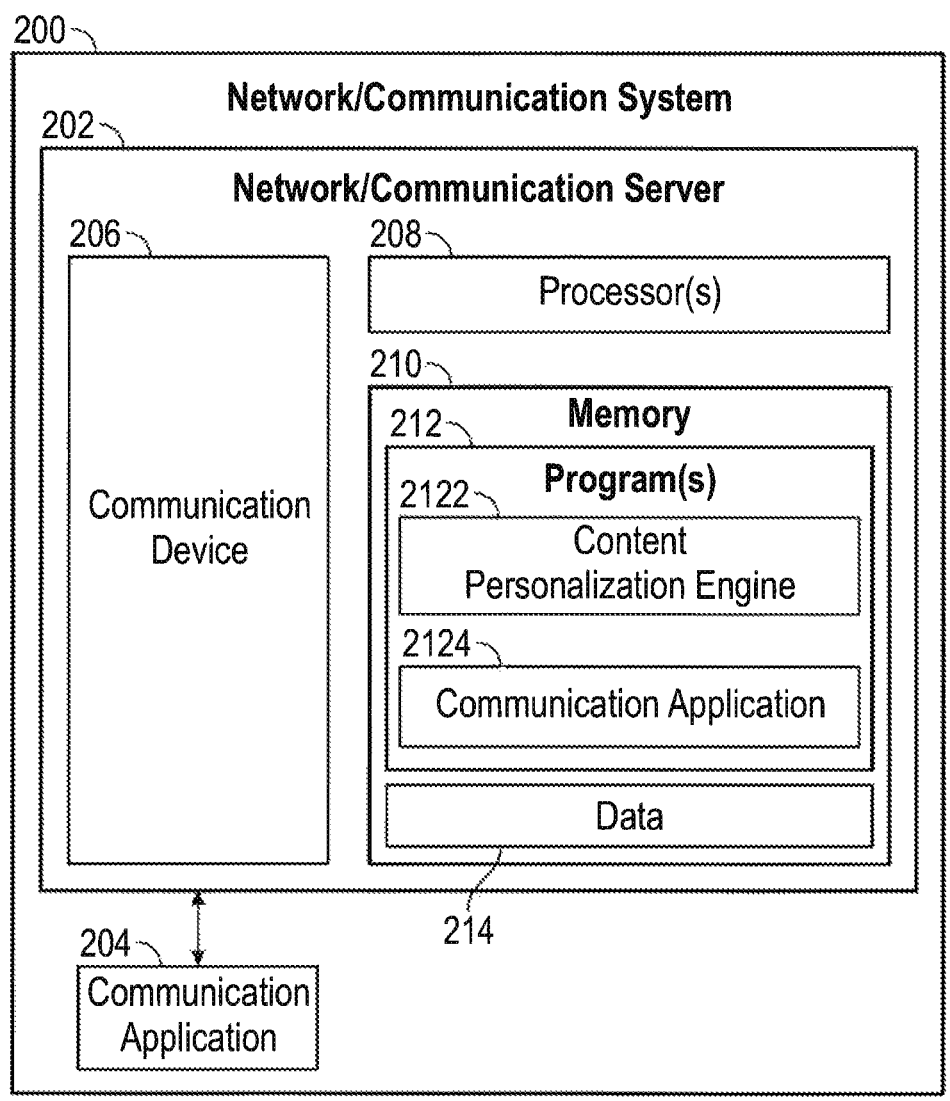
FIG. 2 is another block diagram of an exemplary system and/or platform involving features of content recommendation, consistent with exemplary aspects of certain embodiments of the present disclosure.

FIG. 2 is a block diagram of an exemplary network/communication system 200 involving features of content recommendation, consistent with exemplary aspects of at least some embodiments of the present disclosure. As shown, network/communication system 200 may include network/communication server 202, and communication application 204. Network/communication server 202 may include a communication device 206, one or more processor(s) 208, and memory 210 including one or more programs 212 and data 214. One or more programs 212 includes a communication application 2124 and a content recommendation engine 2122. Network/communication server 202 may be configured to perform operations consistent with providing features and functionality of the communication application 2124 leveraging the functionalities of the content recommendation engine 2122, locally and/or over one or more networks, such as an organization's intranet, the World Wide Web, etc.

Network/communication server 202 may take the form of a server, general purpose computer, mainframe computer, or any combination of these components. Other implementations consistent with disclosed embodiments are possible as well. Communication application 204 may take the form of one or more software applications stored on a computing device, such as network/communication application 108 stored on computing device 102 described above.

Communication device 206 may be configured to communicate with one or more computing devices, such as computing device 102. In some embodiments, communication device 206 may be configured to communicate with the computing device(s) through network/communication application 204. Network/communication server 202 may, for example, be configured to provide instructions and/or operating information to network/communication application 204 through communication device 206. Communication device 206 may be configured to communicate other information as well.

Communication device 206 may be further configured to communicate with the provider system or server 112, one or more other provider systems or servers 114, and/or any third party system 110 involved. Communication device 206 may be configured to communicate with such providers in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. 51, . . . processors) family manufactured by Apple™, or any of various processors manufactured by Sun Microsystems, for example. The disclosed embodiments are not limited to any type of processor(s) otherwise configured to meet the computing demands required of different components of network/communication system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. Such operations may include network/communication activities as well as creation and/or transmission of related network/communication attribute information. The disclosed embodiments are not limited to separate programs or computers configured to perform dedicated tasks. For example, memory 210 may include a single program 212 that performs the functions of network/communication system 200, or program(s) 212 may comprise multiple programs. Memory 210 may also store data 214 that is used by program(s) 212.

In certain embodiments, memory 210 may store one or more sets of instructions involved with carrying out the processes described below, such as in connection with FIGS. 5-6C, according to some embodiments. Other instructions are possible as well. In general, instructions may be executed by processor(s) 208 to perform one or more processes consistent with disclosed embodiments.

The components of network/communication system 200 may be implemented in hardware, software, or a combination of both hardware and software, as will be apparent to those skilled in the art. For example, although one or more components of network/communication system 200 may be implemented as computer processing instructions, all or a portion of the functionality of network/communication system 200 may be implemented instead in dedicated electronics hardware. In some embodiments, network/communication system 200 may also be communicatively connected to one or more database(s) (not shown). Alternatively, such database(s) may be located remotely from network/communication system 200.

Network/communication system 200 may be communicatively connected to such database(s) through a network, such as network 116 described above. Such database(s) may include one or more memory devices that store information and are accessed and/or managed through network/communication system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
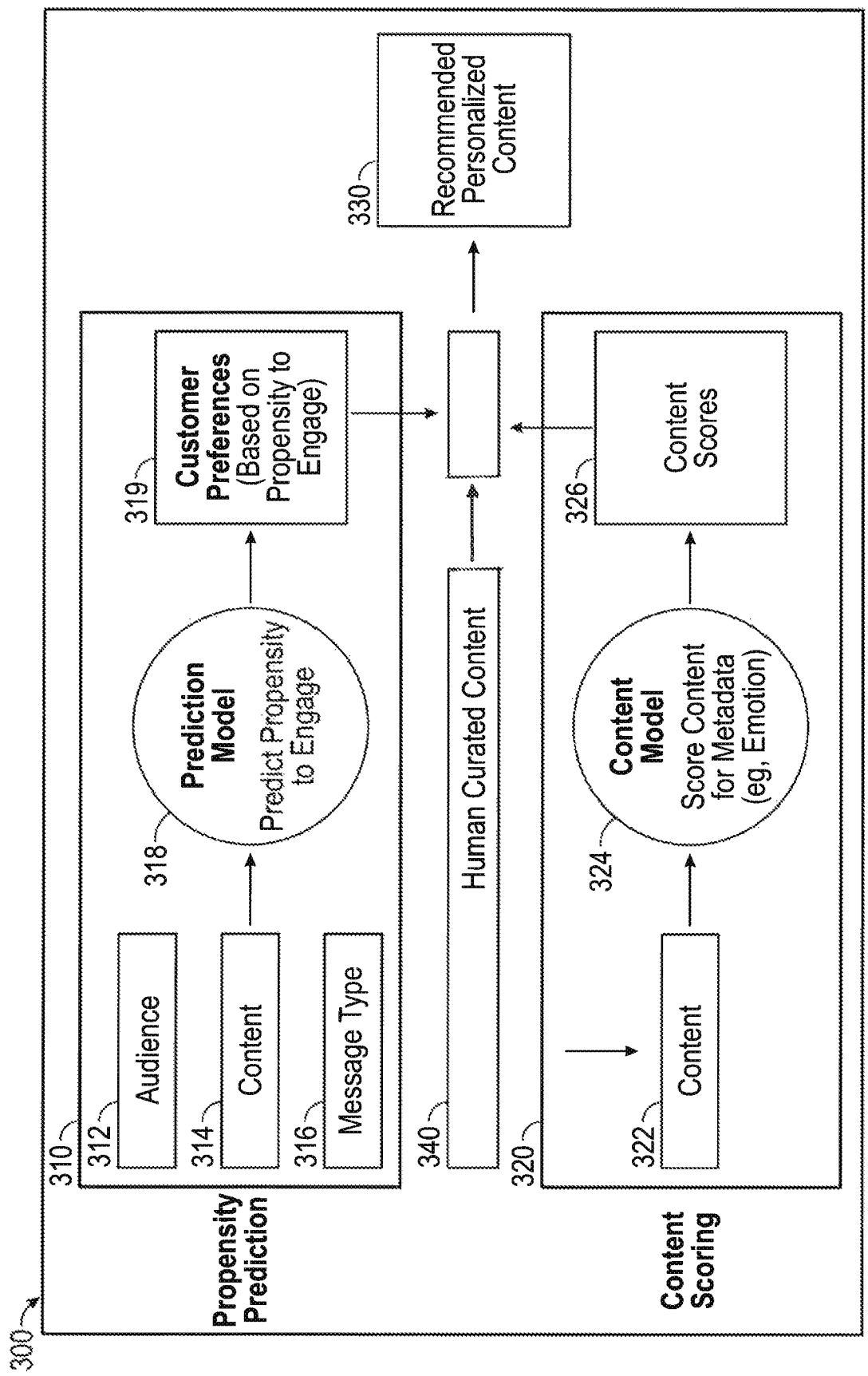
FIG. 3 is a diagram depicting illustrative aspects of an exemplary content recommendation engine, consistent with exemplary aspects of certain embodiments of the present disclosure.

FIG. 3 is a diagram depicting illustrative aspects of an exemplary content recommendation engine, consistent with exemplary aspects of at least some embodiments of the present disclosure. As shown in the exemplary architecture of FIG. 3, an illustrative content recommendation engine 300 operates a customer/content preference predictor 310 and a content analyzer 320 to generate recommended personalized content 330 (e.g., message, part thereof, etc.), and which may also be based also on human curated content 340. The customer predictor 310 operates to receive input such as audience data 312, content data 314, and message type data 316, which is in turn provided to a prediction model 318 to generate customer preferences 319. In some embodiments, customer preferences 319 may include information regarding a customer's likelihood of engagement (e.g., propensity prediction, etc.), a customer's preferred time/schedule for accessing his or her messages, a customer's preferred channel of contacts (e.g., emails, SMS, etc.), and the like, as explained in more detail elsewhere herein. The prediction model 318 may be trained by user data from the same customer, a group of similar customers, content personalization engine generated preferences (e.g., feedback data), or other suitable aggregation of customer data. Content analyzer 320 operates to receive input such as sample data/content 322, which is in turn provided to a content model 324 to generate content scores 326. In some embodiments, the sample data/content 322 may include and/or involve a portion of human curated content 340. In other embodiments, the sample data/content 322 can be the entire collection of the user data collected in the past. Further, the content model 324 may be configured for scoring content along a plurality of dimensions, for example, dimensions of various meta data such as emotion, sentiments, intents, and the like. The content model 324 may be trained by user data from the same customer, a group of similar customers, content recommendation engine generated content (e.g., feedback data, NLG data), or other suitable aggregation of customer data. As shown herein, based on the intelligence gleaned by the audience predicator 310 and the content analyzer 320, the content recommendation engine 300 recommends personalized items of content such as human curated content 340 (e.g., service provider agent selection of a marketing campaign) to generate personalized subject line/content 330.

Figure 4:
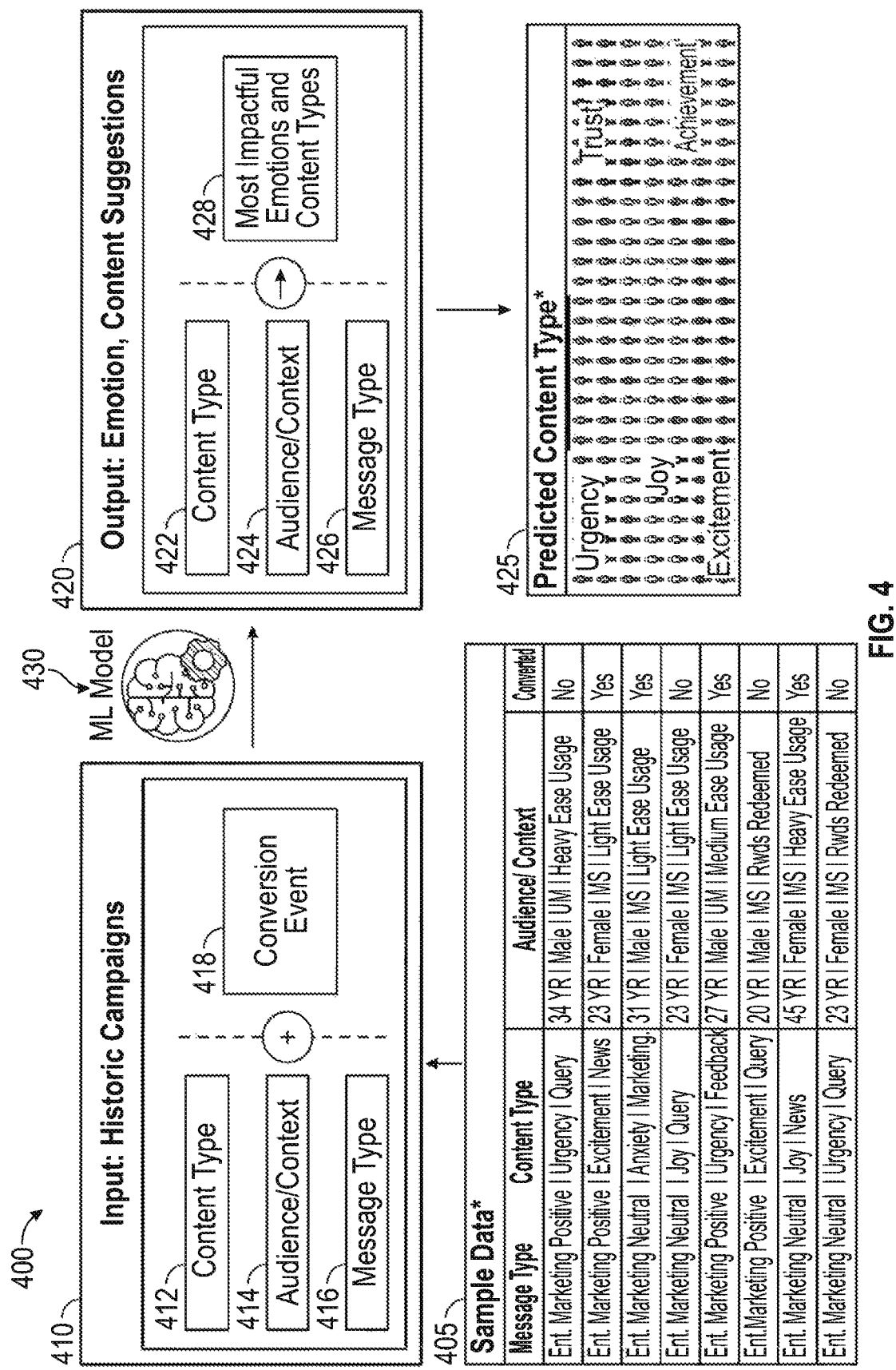
FIG. 4 is a diagram depicting various illustrative features and operations of an exemplary content preference predictor, consistent with exemplary aspects of certain embodiments of the present disclosure.

FIG. 4 is a diagram depicting various illustrative features and operations of an exemplary content preference predictor, consistent with exemplary aspects of certain embodiments of the present disclosure. As shown herein the exemplary architecture, a content preference predictor 400 may include an input receiver 410, a machine learning model 430, and an output provider 420. The input receiver 410 is configured to intake sample data 405 provided to the content preference predictor. In this example, the sample data 405 includes data from the past campaigns, including, for example, content type data 412, audience/context data 414, and message type data 416. In this example, the content preference predictor 400 is further supplied with conversion event data 418. In some embodiments, the message type data 416 can include information indicating whether a message is an enterprise marketing message. The content type data 412 can include information indicating a three-factor semantic descriptions of the content of a message. For example, a content type may indicate "positive, joy, query," "positive, excitement, query,"

etc. More detail with regard to the content type is described below with reference to FIGS. 5-6C. The audience/context data 414 can include information of customer profile data and the level of usage of a service/product. For example, the customer profile data can include demographic information such as the date of birth and gender of a customer. The conversion event data 418 can include information indicating whether a customer targeted by the message has been converted in receipt thereof. In other embodiment, the input receiver 410 can be configured to intake any types of data that is useful for the content preference predictor 400 to create and train its prediction model 430 to generate predictions/recommendations.

As to the output, the output provider 420 of the content preference predictor 400 is configured to provide a set of one or more predictions on customer preferences. As shown herein, such predicted preferences include predictions of content type 422, predictions of audience/context 424, and predictions of message type 426. Based on the predicted customer preferences (e.g., customer intelligence), impactful meta data (e.g., emotion content) as well as impactful content (e.g., an item of content that most likely is to engage a customer, an item of content that is of high interest to a customer at a particular context) 428 can be determined, and subsequently used to verify the degree of relevancy, engagement, impactfulness of an existing item of content (e.g., a digital message to be sent to a customer), or generate a relevant and engaging message. As shown herein FIG. 4, a matrix 425 of predicted content types is displayed to show representative content types, e.g., FIG. 4 showing non-limited examples thereof, such as urgency, trust, joy, achievement, and excitement.

Figure 5:
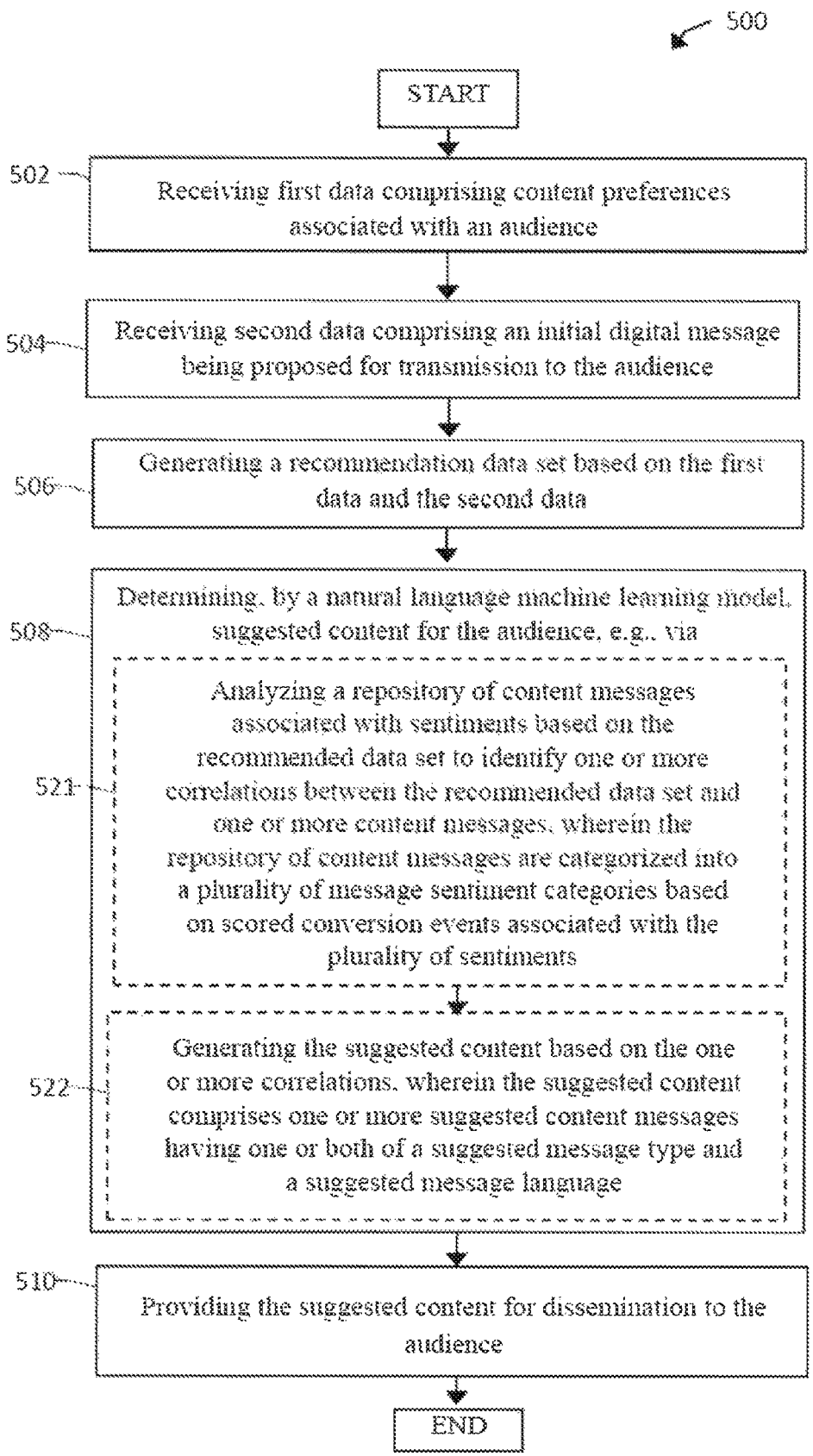
FIG. 5 is a flowchart illustrating one illustrative process associated with content recommendation, consistent with exemplary aspects of certain embodiments of the present disclosure.

FIG. 5 is a flowchart illustrating one illustrative process associated with content recommendation, consistent with exemplary aspects of certain embodiments of the present disclosure. Referring to FIG. 5, an illustrative content recommendation process 500 may comprise: receiving first data comprising content preferences associated with an audience, at 502; receiving second data comprising an initial digital message being proposed for transmission to the audience, at 504; generating a recommendation data set based on the first data and the second data, at 506; determining, by a natural language machine learning model, suggested content for the audience, at 508; and providing the suggested content for dissemination to the audience, at 510. Further, the content recommendation process 500 may be carried out, in whole or in part, online, e.g. via a content recommendation engine and/or it may be carried out by in conjunction with various messaging application functionality, described above.

Further, the step of determining, by a natural language machine learning model, suggested content for the audience 508, may include one or both of: (i) analyzing a repository of content messages associated with a plurality of sentiments based at least in part on the recommended data set to identify one or more correlations between the recommended data set and one or more content messages, wherein the repository of content messages are categorized into a plurality of message sentiment categories based on scored conversion events associated with the plurality of sentiments, at 521, and/or (ii) generating the suggested content based on the one or more correlations, wherein the suggested content comprises one or more suggested content messages having one or both of a suggested message type and a suggested message language, at 522.

In some embodiments, content recommendation process 500 may include, at 502, a step of receiving first data comprising content preferences associated with an audience. With regard to the disclosed innovations, such first data may be generated via the at least one computer passing inputs to and retrieving outputs from the content preference predictor engine that provides the content preferences predicted to be of interest to an audience. Further, according to various embodiments, step 502 may be performed by at least one computer, such as a computer associated with at least one financial institution. Such financial institution may include a bank, credit card issuer, or any other type of financial service entity that generates, provides, manages, and/or maintains financial service accounts for one or more individuals, as well as conducts marketing campaigns reaching a targeted audience.

The content recommendation process 500 may include, at 504, a step of receiving second data comprising an initial digital message being proposed for transmission to the audience. In some embodiments, step 504 may be performed by the at least one computer.

The content recommendation process 500 may include, at 506, a step of generating a recommendation data set based at least in part on the first data and the second data. Further, according to various disclosed embodiments, the recommendation data set may identifie at least one recommended content type; and at least one recommended message type. In some embodiments, step 506 may be performed by the at least one computer.

Content recommendation process 500 may include, at 508, a step of determining suggested content for the audience. With regard to the disclosed innovations, such suggested content for the audience may be determined via a natural language generation (NLG) machine learning model. Various embodiments herein may be configured such that step 506 may comprise: analyzing a repository of content messages associated with a plurality of sentiments based at least in part on the recommended data set to identify one or more correlations between the recommended data set and one or more content messages; and generating the suggested content based on the one or more correlations. According to embodiments herein, for example, the repository of content messages may be categorized into a plurality of message sentiment categories. In some embodiments, such categorization may be based on scored conversion events associated with the plurality of sentiments. In other embodiments, the suggested content may comprise one or more suggested content messages having one or both of a suggested message type and a suggested message language. In some embodiments, step 508 may be performed by the at least one processor.

According to various embodiments, the repository of content messages may be generated based on categorizing communication content into categories of elements; and tagging each categorized element with a set of one or more metadata. Here, for example, the categories of elements may comprise one or more of: a subject line; a preheader; a banner image; an introductory section; a call to action; a preheader; a body section; a value proposition; and/or an end section. Further, in some implementations, the metadata may comprise one or more dimensions regarding emotions; intent; and/or sentiments.

In some embodiments, the NLG machine learning model may be configured to score an element of content based on a category associated therewith and the repository of content messages. In other embodiments, the NLG machine learning model may comprise a cross opportunity machine learning model; and/or be trained with historical data and/or feedback data. In some other embodiments, the machine learning model may be trained with user profile data. According to various examples, the user profile data may comprise historical user data related to one or more of: payment activity; reward activity; and/or response to promotional offers.

With regard to the suggested content, implementation herein may be configured such that the suggested content is generated via passing inputs to and retrieving outputs from a sentiment analyzer. In one example, the sentiment analyzer may analyze prior communications associated with the audience and/or determine sentiments that yield conversion events associated with respective communications to or from the audience.

In some embodiments, one or both of the inputs to the content preference predictor engine and the inputs to the sentiment analyzer may comprise communications with customers. In some embodiments, the outputs from the content preference predictor engine may comprise one or more of: a level of likelihood of engagement with the content to disseminate; a likely time to access the content to disseminate; and/or a type of communication channel at which to access the content to disseminate, and a likely sentimental preference in communication.

In other embodiments, the outputs from the sentiment analyzer may comprise an impactful semantic category for a target audience. In some implementations, the impactful semantic category may be selected from a plurality of categories comprising three or more of: a sentiment category; an emotion category; a perceived message type category; a semantic relatedness category; a feeling category; a tone category; a perception category; a micro structure category; and/or an emotional intelligence category. In other implementations, the sentiment category may be comprised of 2 or more subcategories selected from positive; neutral; and/or negative.

Further, various embodiments herein may be configured such that the emotion category may be comprised of 3 or more; or 4 or more; or 5 or more; subcategories selected from a group composed of boredom; anger; excitement; sadness; fear; joy; trust; pride; anticipation; anxiety; safety; urgency; luck; guilt; exclusivity; fascination; achievement; gratification; encouragement; intimacy; curiosity; gratitude; and/or challenge.

In some embodiments, the suggested content may comprise one or both of: a determination as to whether an item of content will have an expected impact; and/or a recommendation to the user, the recommendation being based at least in part on the suggested content determined. In other embodiments, the suggested content may comprise image content. In various implementations, the image content may comprise information regarding one or more of: emotional content; formatting content; and/or imagery content.

In some embodiments, the suggested content may comprise a set of one or more of: call to action (CTA) attributes. In various implementations, a CTA attribute may correspond to one of the following: a position parameter; a functional parameter; a length parameter; a degree of urgency of action parameter; an indicator of direct call-out parameter; and/or a formatting parameter. Here in some examples, the formatting parameter may comprise at least one of: a color parameter; a font parameter; and/or an Emoji parameter.

In some embodiments, the suggested content may comprise one or more of: subject line content; and/or preheader content. In some implementations, the subject line content may comprise information regarding one or more of: emotional content; subject line sentence/phrase structure; subject line tone; and/or subject line addressee.

In some embodiments, the suggested content may comprise body content. In some implementations, for example, the body content may comprise information regarding one or more of: introductory content; emotional content; ending content; main message content; and/or formatting content.

In some other embodiments, the suggested content may comprise a first portion of personalized content that corresponds to the message sentiment category determined to be impactful to the audience, a second portion of personalized content that corresponds to the emotion category determined to be impactful to the audience, and a third portion of personalized content that corresponds to the perceived message type category determined to be impactful to the audience.

Content recommendation process 500 may include, at 510, a step of providing the suggested content for dissemination to the audience. According to various embodiments, such suggested content may be provided via an application program interface (API) for dissemination to the audience. In some embodiments, step 510 may be performed by the at least one computer. Further, according to various disclosed innovations, each respective semantic numerical score may be based on an evaluation of each respective subcomponent text section in a respective semantic category of a plurality of semantic categories. In one embodiment, the plurality of the semantic categories may comprise at least three semantic categories. Here, for example, the at least three semantic categories may be selected from a sentiment category, an emotion category, an intent category, a semantic relatedness category, a feeling category, a tone category, a perception category, a micro structure category, and an emotional intelligence category.

With regard to the first set of subcomponent text sections, implementations herein may be configured such that the first set of subcomponent text sections comprises 3 or more parts, including 3 or more of: a subject line; a preheader; a banner image; an introductory section; and/or a call to action. Moreover, particularly when the first message type comprises email messages, implementations herein may be configured such that the first set of subcomponent text sections comprises 3 or more parts. Here, for example, the 3 or more parts may include 3 or more of: a subject line; a preheader; a banner image; an introductory section; and/or a call to action.

Figure 6A:
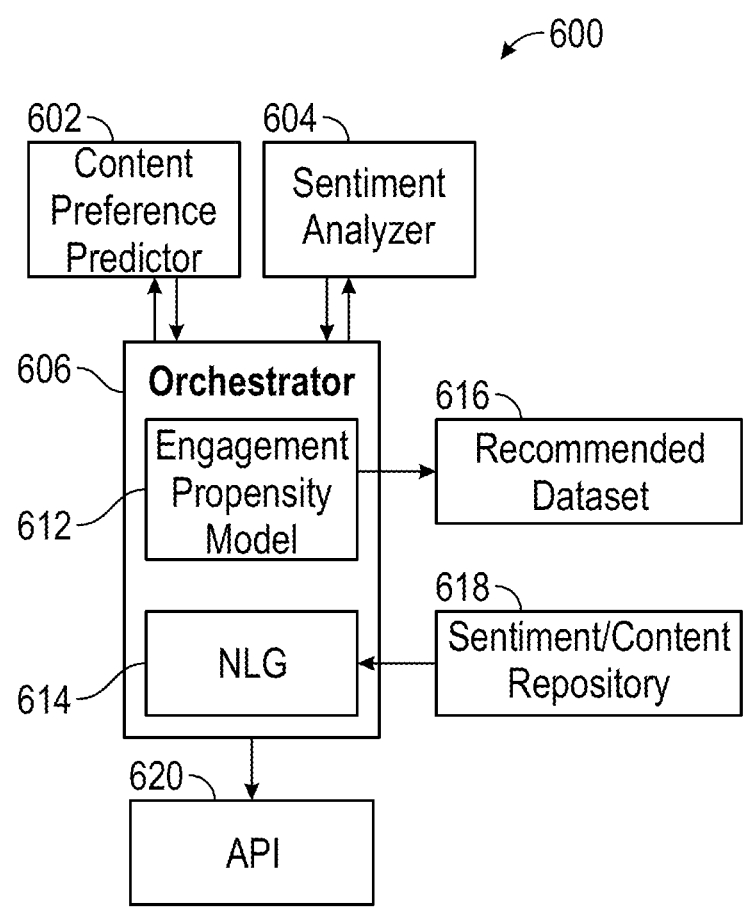
FIG. 6A is a block diagram depicting an exemplary system for content recommendation, consistent with exemplary aspects of certain embodiments of the present disclosure.

FIG. 6A is a block diagram depicting an exemplary system for content recommendation, consistent with exemplary aspects of certain embodiments of the present disclosure. As shown in the exemplary block diagram of FIG. 6A, recommendation system 600 may comprises a content preference predictor 602, a sentiment analyzer 604, a recommendation orchestrator 606, a recommendation dataset 616, a sentiment and/or similar content repository 618, and an application programming interface (API) 620. The recommendation orchestrator 606 component may comprise an engagement propensity model 612, and an NLG machine learning model 614.

As described above with connection to FIGS. 3-4, the content preference predictor 602 is configured to generate customer preferences, and the sentiment analyzer 604 is configured to analyze and score content along a plurality of dimensions, for example, dimensions of various metadata such as emotion, sentiments, intents, and the like. The recommendation orchestrator 606 is configured to communicate with both the content preference predictor 602 and the sentiment analyzer 604 to leverage the insight, intelligence, and sentimental information about the audience. In some embodiments, recommendation orchestrator 606 is configured to generate a first set of data via passing inputs to and retrieving outputs from the content preference predictor 602 to obtain insights regarding content of interest to the audience. For example, the insights may include one or more of: a level of likelihood of engagement with the content to disseminate, a likely time to access the content to disseminate, and/or a type of communication channel at which to access the content to disseminate.

The recommendation orchestrator 606 is also configured to generate a second set of data via passing input to and retrieving output from the sentiment analyzer 604 to determine sentiments that are prominent in communications to or from the audience. According to various embodiments, the determined sentiments may comprise an impactful semantic category for a target audience. In some embodiments, the impactful semantic category may be selected from a plurality of categories comprising one or more of: a sentiment category; an emotion category; an intent category; a semantic relatedness category; a feeling category; a tone category; a perception category; a micro structure category; and/or an emotional intelligence category. In some implementations, the sentiment category may be comprised of 2 or more subcategories selected from positive, neutral, and negative. In other implementations, the emotion category may be comprised of 3 or more subcategories selected from a group composed of happiness, concern, excitement, sadness, candor and boredom. In some other implementations, the intent category may be comprised of 2 or more subcategories selected from a group composed of news, feedback, query, marketing, and spam.

In some embodiments, the engagement propensity model 612 is configured to transform the first set of data and the second set of data into the recommendation dataset 616. Here, for example, the engagement propensity model 612 may be configured to combine the learnings (e.g., predictions, etc.) from the content preference predictor 602 with content from the NLG engine 614 scored using the sentiment analyzer 604. Based on the scored content, an audience may be mapped to the content with highest propensity for engagement to build the recommended dataset 616. In some implementations, the engagement propensity model 612 is also configured to generate one or both of the first set of data; and/or the second set of data.

According to various aspects of the innovation, the natural language generation (NLG) machine learning model 614 is configured to determine suggested content, for an audience, derived from the sentiment repository 618 (e.g., the sentiment repository of the sentiment analyzer 604). The application program interface (API) 620 is configured to provide a recommendation to the user, the recommendation being based at least in part on the determined suggested content. In some embodiments, the API 620 is configured as a set of one or more interface commands, which are invoked by a user (e.g., an agent of the financial service entity) to verify, an/or gauge the impactfulness of items of content for delivery to a customer (e.g., marketing digital messages), and/or retrieve recommendation regarding personalized content for delivery to the customer. An example GUI application implementing a portion of the API 620 is described with connection to FIG. 15, below.

Figure 6B:
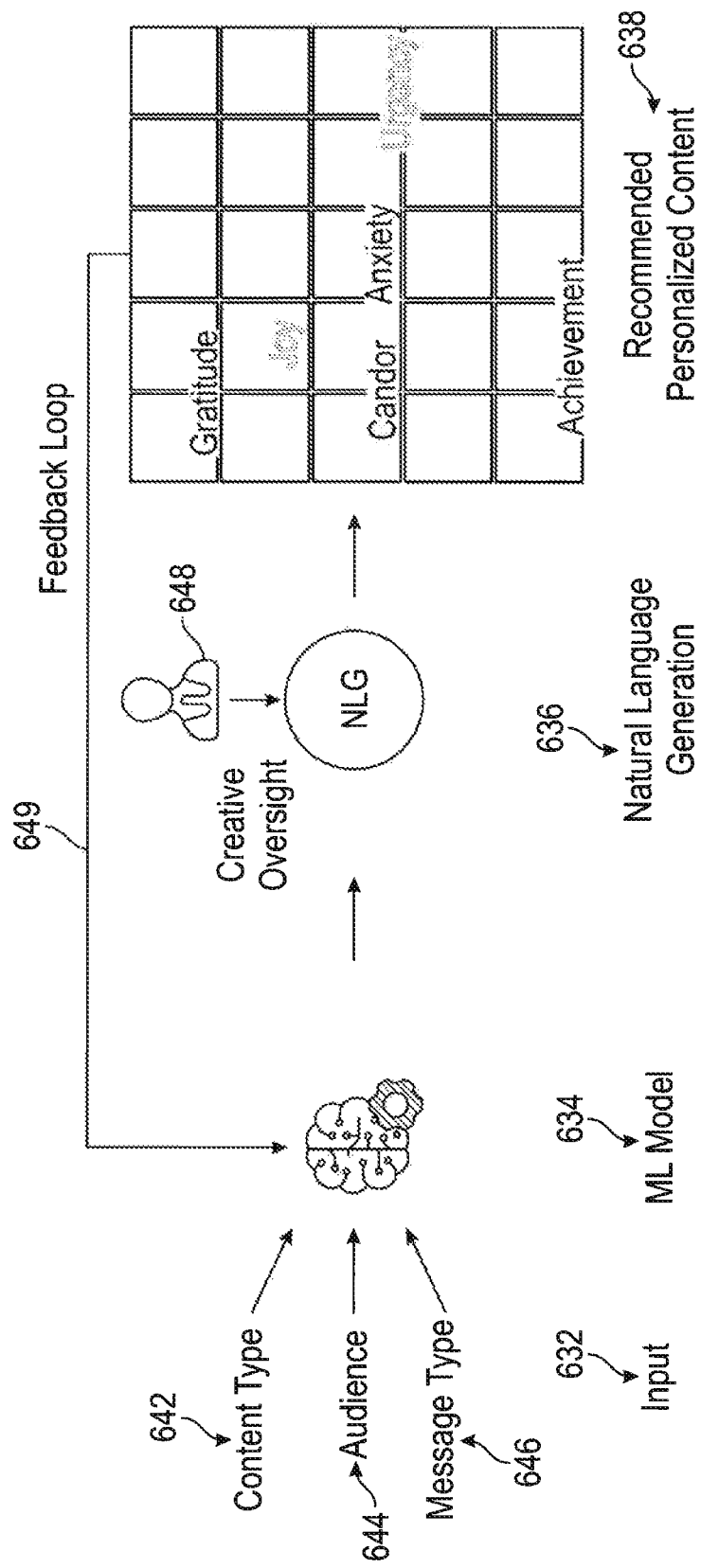
FIG. 6B is a diagram illustrating various aspects and operations of content recommendation, consistent with exemplary aspects of certain embodiments of the present disclosure.

FIG. 6B is a diagram illustrating various aspects and operations of content recommendation, consistent with exemplary aspects of certain embodiments of the present disclosure. As shown herein the exemplary diagram, a content recommendation process starts with receiving inputs 632 from a user of the recommendation system (e.g., via the API 620). In this example, the inputs may include one or more of: content type 642, audience information 644, and/or message type 646. In some embodiments, such inputs may be determined by a content preference predictor and a sentiment analyzer. Using a machine learning model 634, a NLG process 636 may be configured to generate recommended personalized content 638, based on the inputs. In some embodiments, such NLG process 636 may be configured to generate recommended personalized content 638 leveraging a sentiment repository (not shown) generated by the sentiment analyzer. In other embodiments, the NLG process 636 may be further configured to generate recommended personalized content 638 leveraging oversight/collaboration with a content overseeing entity 648. For example, the content overseeing entity 648 may include oversight of a human creative content team. For another example, the content overseeing entity 648 may include oversight of a third-party. According to various embodiments, the recommended personalized content 638 may comprise content having various sentiment characteristics. For example, such sentiment characteristics may include one or more of: a sentiment category, such as a general sentiment category (e.g., positive, negative, neutral, etc.), perceptions, feelings (e.g., gratitude, candor, anxiety, urgency, joy, achievement, etc.), latent feelings, emotions (e.g., bored, angry, excited, sad, fear, happy, trust, pride, anticipation, etc.), tone (e.g., direct, indirect, offbeat, familiar, formal, informal, analytical, etc.) and/or other characteristics, including additional examples set forth in the present disclosure, such as set forth, below, and elsewhere herein.

Figure 6C:
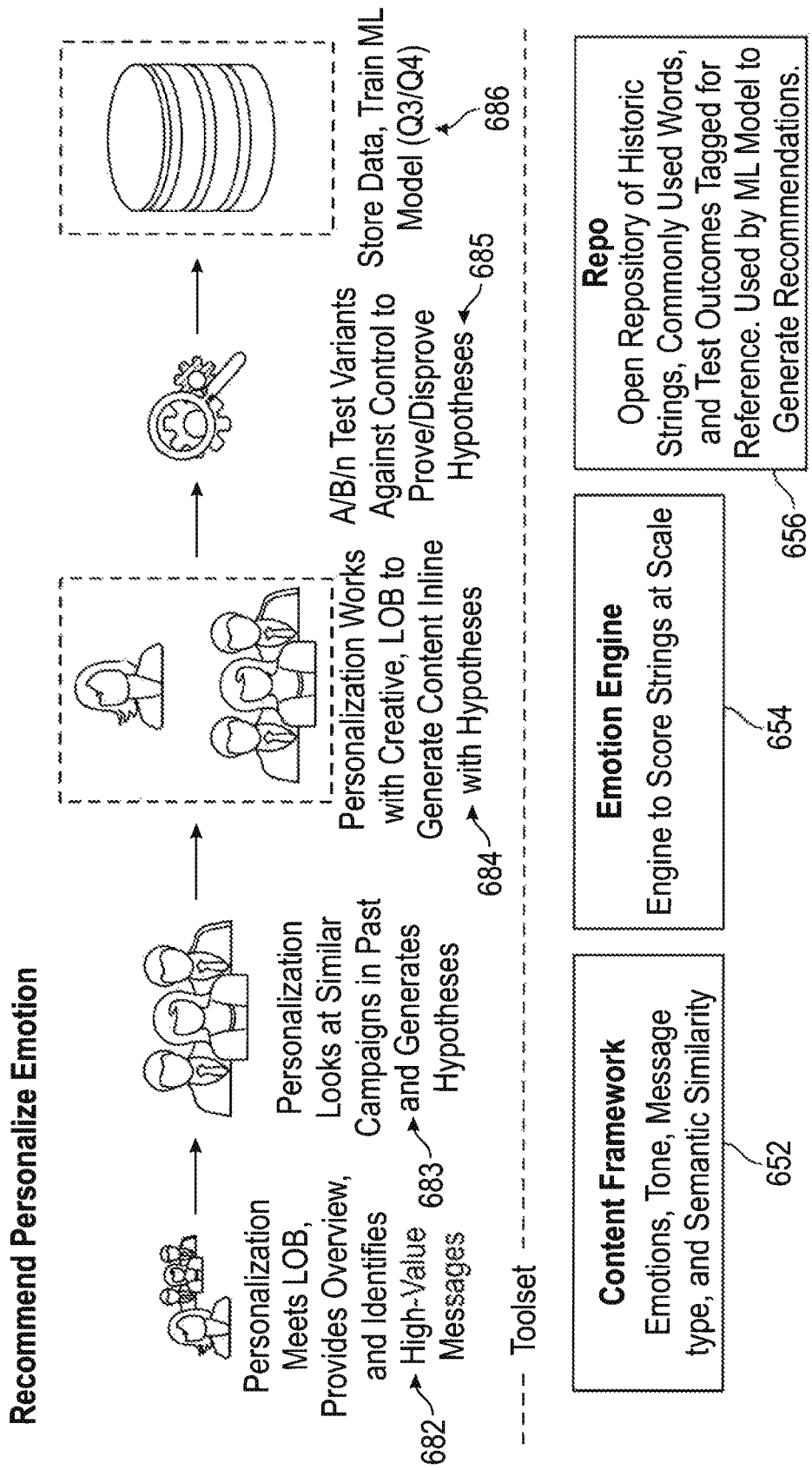
FIG. 6C is another diagram of various aspects of operations of content recommendation, consistent with exemplary aspects of certain embodiments of the present disclosure.

FIG. 6C is another diagram of various aspects of operations of content recommendation, consistent with exemplary aspects of certain embodiments of the present disclosure. As shown herein the exemplary diagram, a process for recommending personalized emotion characteristics for content may be implemented with a toolset comprising a content framework 652, an emotion engine 654, and a repository 656. According to various embodiments, the content framework 652 is configured to categorize and tag elements of content. In some embodiments, the content framework 652 is configured to categorize and tag elements of content along the dimensions of emotion, tone, message type, semantic similarity, and/or other content similarity, and the like. In some implementations, the dimensions of meta data may be configured with an order. For example, the dimensions of meta data may include a primary dimension, a secondary dimension, and a tertiary dimension. In other examples, a dimension may give insight to another dimension (here, for example, dimensions may be inter-related, e.g., "happiness" relates/leads to "pride", which relates/leads to "confidence." In some embodiments, items of content (e.g., a digital message provided by an agent for delivery to a customer, historic message data) may be characterized into one or more categories of symbol, introduction, call to action, (CTA) subject line, body content, banner, banner image, preheader, headline, and the like. Further, items of content corresponding to each category of content may be tagged with meta data such as emotion, sentiments, intents, and the like. According to various embodiments, a sentiment repository 656 may be generated based on the categorized and tagged content. For example, content of the sentiment repository 656 may be tagged at any suitable dimension of meta data (e.g., 40 types of meta data). In some embodiments, historic items of content, commonly used words/phrases/sentences/images, as well as various testing results/feedbacks may be tagged and recorded in the sentiment repository 656. Equipped with the knowledge of the categorized and tagged content collected in the sentiment repository 656, a machine learning model (e.g., an emotion engine 654) may be configured to score items of content based on the respective category. In some embodiments, based on the scoring of items, an item of content may be verified in terms of whether the content incurs the desired sentimental effect. In other embodiments, also based on the scoring of items, items of content may be recommended to effectuate the desired sentimental effect.

An illustrative content framework, consistent with one or more aspects of certain embodiments of the present disclosure may include exemplary dimensions on which content may be evaluated and/or scored to identify customer preferences. The various exemplary dimensions by which content may be evaluated and/or scored may include, though are not limited to, one or more of sentiment, microstructure of content, latent feelings, semantic similarity, intra content sequences, perceptions, emotions, and tone, among others. The sentiment dimension may comprise a variety of sentiment categories, such as general sentiment category (positive, negative, and/or neutral), although other sentiments, such as those described elsewhere throughout this disclosure, may also be utilized. The exemplary microstructure dimension may comprise a variety of sub-segments of content, such as subcomponents of a subject line of a message or other information being analyzed. The exemplary latent feelings dimension may comprise a set of secondary or second-level metadata that is linked to a main set of emotions identified for analysis, i.e., the emotions identified below and/or elsewhere in the disclosure. In some embodiments, the exemplary semantic similarity dimension may comprise scored similarity measure/gauge between different message components, such as between the subject line, the body, or between any various message components. Further, the content framework may include an intra content sequences dimension by which sequence or sequences of various microstructures of the messages being analyzed may be evaluated and/or scored to identify customer preferences. The content framework may also include a perceptions dimension which may include various categorization of the message related to how it is presented to, perceived by, or processed by a recipient, such as whether it is deemed a message related to providing news, soliciting feedback, whether it represents a query, is a marketing communication, seen as spam, or the like. As discussed, above, the content framework may include an emotions dimension that may detect a variety of emotions in messages, which may similarly be evaluated and/or scored to identify customer preferences, such as bored, angry, excited, sad, fear, happy, trust, pride, and anticipation, among others. As a final element, the content framework may include a tone dimension which may identify customer preferences by evaluating and/or scoring a particular tone of or in a message, such as direct, indirect, offbeat, familiar, formal, informal, and analytical, among others.

Figure 7A:
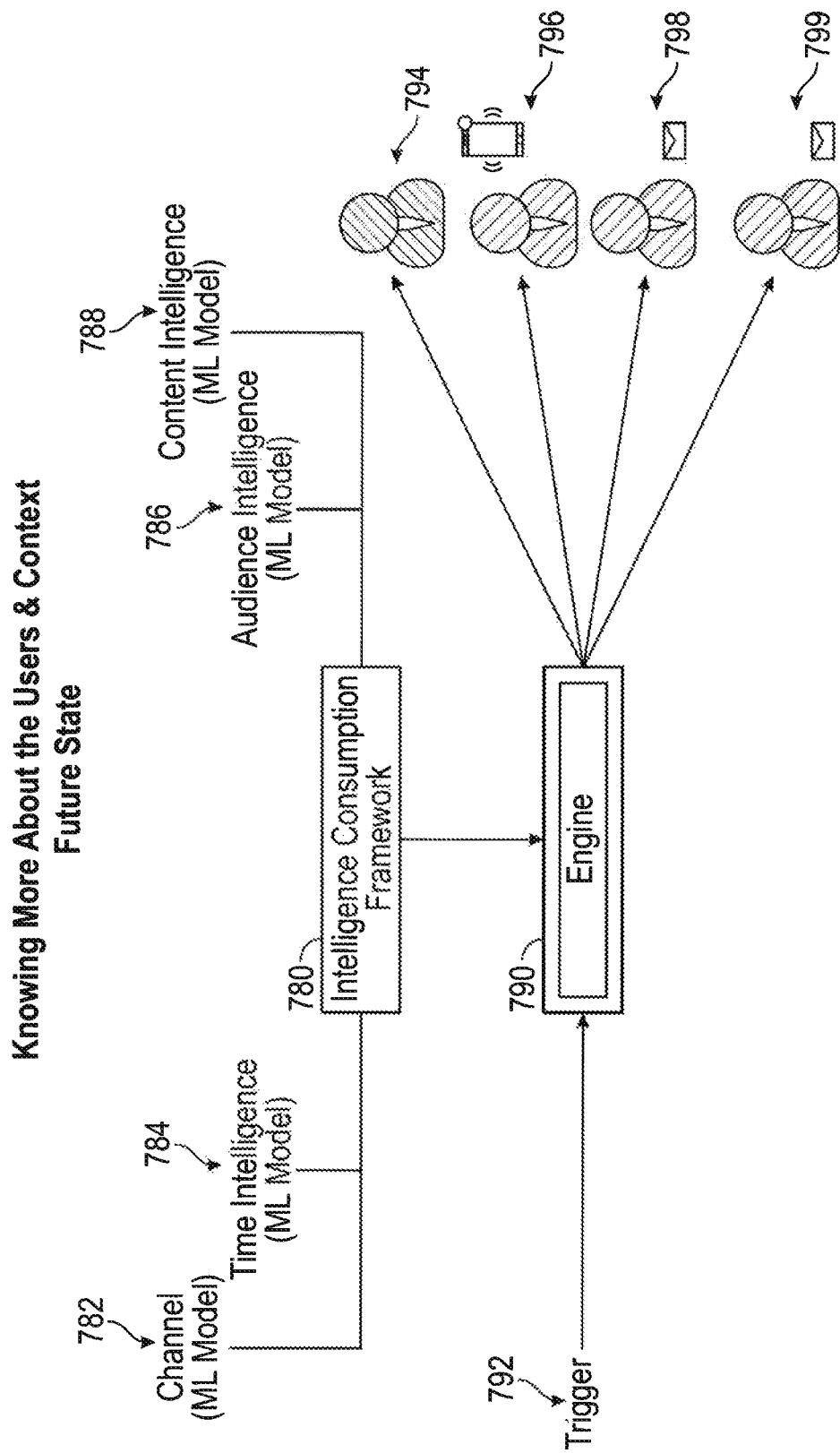
FIGS. 7A-7B are diagrams illustrating various aspects and operations associated with content recommendation, consistent with exemplary aspects of certain embodiments of the present disclosure.

FIG. 7A is a diagram illustrating various aspects and operations associated with content recommendation, consistent with exemplary aspects of certain embodiments of the present disclosure. As shown herein, a messaging engine 790 is configured in communication with an intelligence consumption framework 780 to access and utilize various intelligence generated based on various customer knowledge bases. For example, one or more of channel intelligence 782, time intelligence 784, audience intelligence 786, and content intelligence 788 may be included and feed information to the intelligence consumption framework 780.

Empowered with various intelligence regarding the creation and transmission of a message, upon receiving a trigger signal 792, a messaging engine 720 may be configured to transmit personalized messages 796, 798, and 799 to customers at respective personalized communication channels, or not to transmit a message (lack of a message) 794 to a customer. For example, the message 796 may be transmitted to a customer as a SMS message to the mobile device of the customer. Both message 798 and message 799 may be transmitted to a respective customer as an email message to an respective email address associated with the customers. However, as indicated by the varying patterns of the hatching lines, the email message 798 is personalized differently than the email message 799, depending on the semantic scores of the respective customers.

Messages 796-799 can be personalized via various manners to tailor to the customer's persona information as well as the customer's contextual information. For example, the text message 796 may be specifically shortened in order to improve the degree of candor of the message, action-oriented words can be packed into the limited number of words to increase the likelihood of engagement with the customer. For another example, email messages 798 and 799 may be personalized by addressing the customers with their respective first names in the subject line, introducing a tone expressing concern and urgency in reminding the customer the importance of reading its content (e.g., to help the customer stay current regarding various security fraud issues and/or preventative measures of interest to them, etc.) More detail regarding content personalization is described below with references to FIGS. 8-13.

Figure 7B:
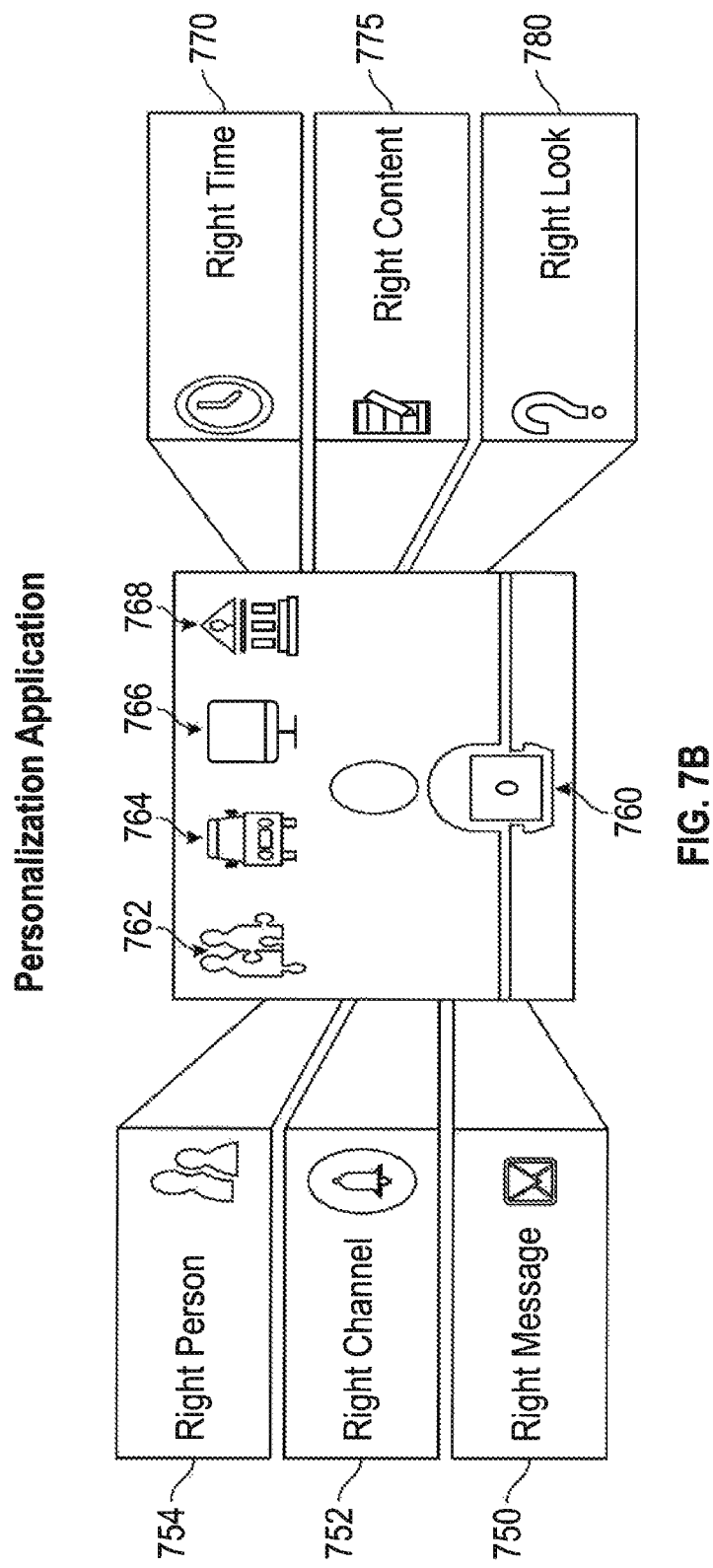

FIG. 7B is a diagram illustrating various aspects and operations associated with content recommendation, consistent with exemplary aspects of certain embodiments of the present disclosure. As shown herein, intelligence 754 on who is the right person, intelligence 752 on which is the right communication channel, and intelligence 750 on what is the right message may be supplied to assist a content personalization engine 760 to generate intelligent messages that leverage the intelligence 754, 752 and 750 to achieve: 1) being transmitted at a right time 770 (e.g., preferred time), 2) including the right content 775 (e.g., personalized content), and/or 3) being presented in the right look-and-feel 780 (e.g., personalized according to various semantic scores). As also illustrated herein, the content personalization engine 760 may further take into account various contextual information such as relationship information 762, location information 764, device and message consumption information 766, and/or transaction information 768.

Figure 8:
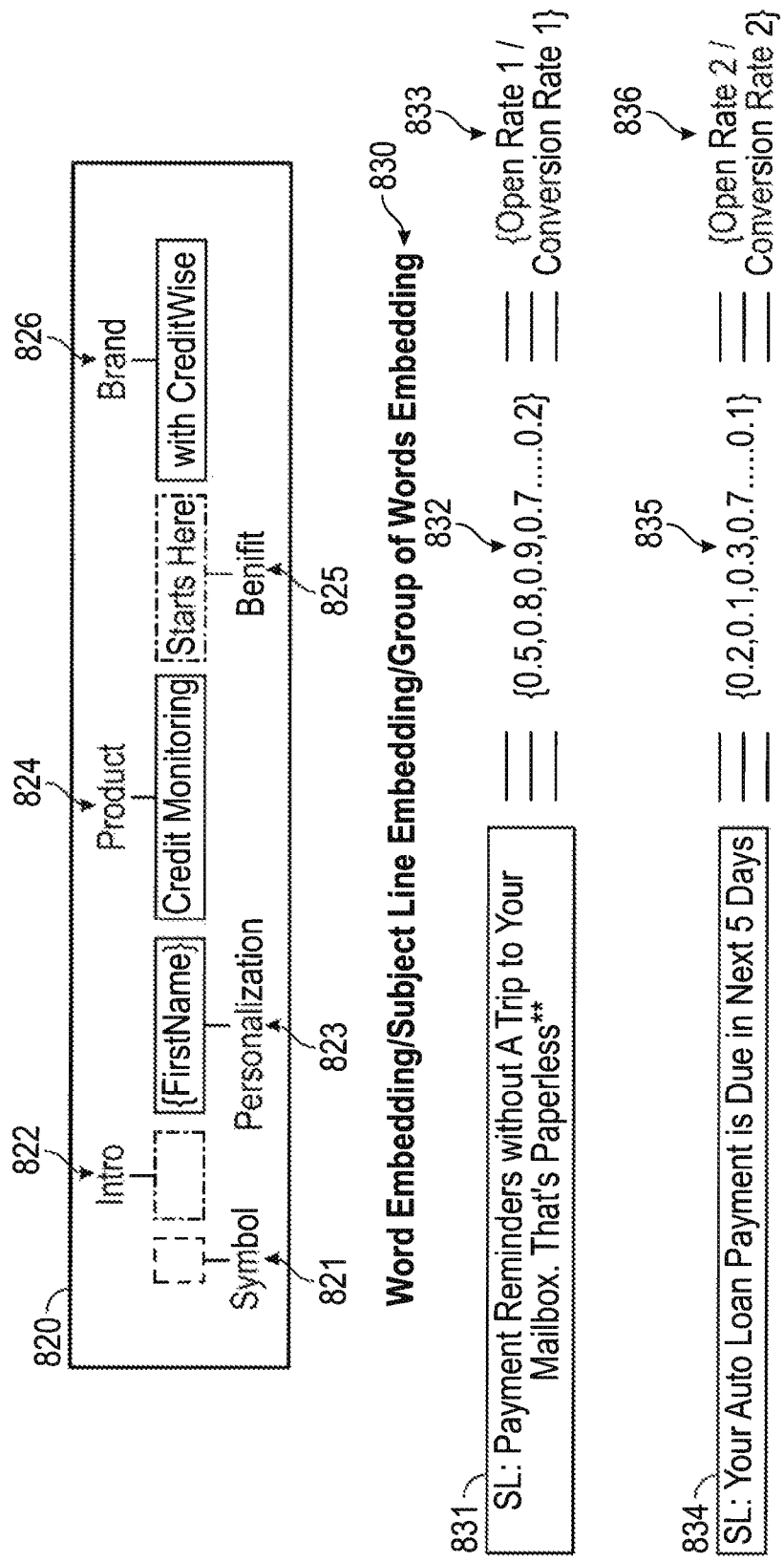
FIG. 8 illustrates various aspects of exemplary subject lines and associated features involved with content personalization, consistent with exemplary aspects of certain embodiments of the present disclosure.

FIG. 8 illustrates various aspects of exemplary subject lines and associated features involved with content personalization, consistent with exemplary aspects of certain embodiments of the present disclosure. As shown herein, a subject line 820 can be personalized via splitting the subject line 820 into a set of subcomponents, using machine learning models and techniques. In this example, the set of subcomponents includes a symbol 821, an introduction 822, a personalized first name 823, a product description 824, a benefit description 825, as well as brand description 826. In some embodiments, the splitting of the subject line 820 into the plurality of subcomponent can be validated and improved with more precision. Next, machine learning techniques/models can be used to optimize on the identified subcomponents for personalization. For example, emotion related prediction can be applied to the subcomponent of benefit description, as it has the possibility being modified to best emotionally appeal to a target customer. Optimization can also be performed with regard to the positioning of each of the subcomponents within the subject line 820, as well as the functionality or persuasiveness associated with the different wording of one or more subcomponents 821-826.

Various features of embedding salient information in a subject line are also illustrated in FIG. 8. In the exemplary approaches shown, for example, one or more techniques of word embedding, subject line embedding, and/or groups of word embedding may be utilized to personalize a subject line. As used herein, "embedding" refers to a technique that converts text/word or other non-numeric information into numbers. With such textual or non-numeric information represented in respective numbers, NLP techniques can be used to transform words into one or more vectors of numbers for feeding into a machine learning model. For example and as shown herein, a textual subject line 831 can be transcribed into a vector of numbers 832, which is in turn provided to a machine learning model for processing. As shown herein, the machine model outputs an evaluation 833 of the predicted effectiveness for the subject line 831. In comparison, a subject line 834 can be transcribed into a vector of number 835, which prompts the machine learning model to provide an evaluation 836 of the predicted effectiveness for the subject line 834. In some embodiment, such effectiveness is captured in terms of a rate of how likely the target customer will open the content, as well as a rate of how likely the target customer will be converted by the content.

Figure 9A:
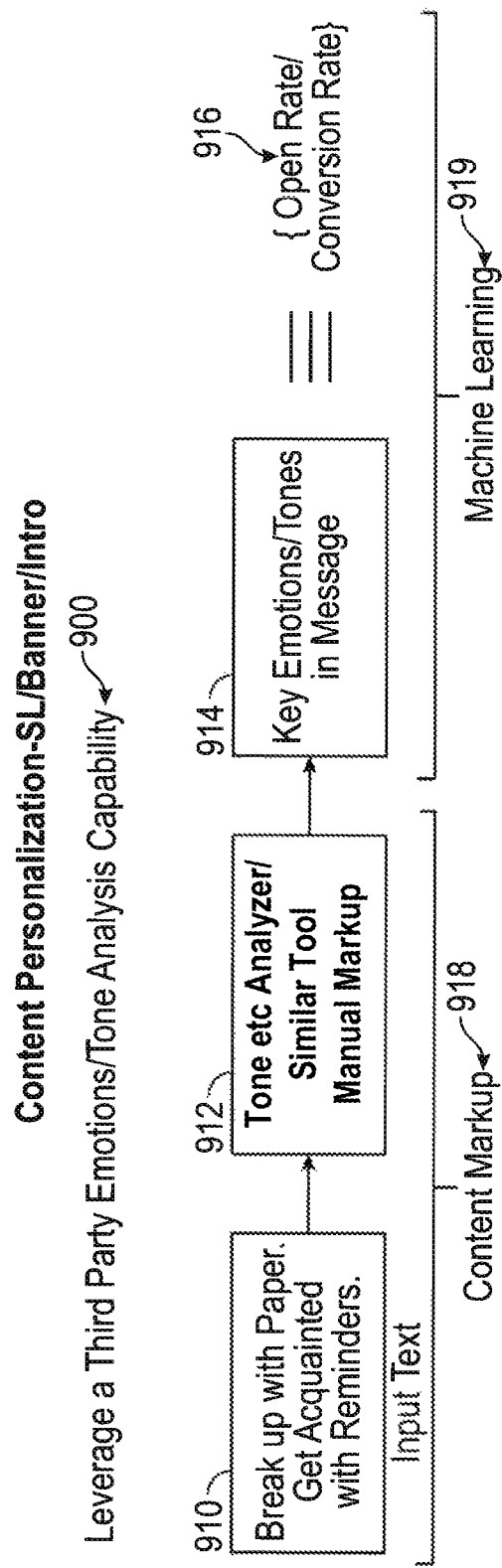

FIG. 9A is a diagram illustrating exemplary aspects associated with content personalization of subject lines, banners and introductory material, consistent with exemplary aspects of certain embodiments of the present disclosure. As shown herein, at content markup stage 918, historical content (e.g., historical messages) can be provided to a mark-up tool 912 for manual annotating content such as a subject line, a banner, or an introductory portion of a message, inter alia. Such markup tools can include, for example, Watson™ tone analyzer, and/or other suitable libraries or tools. In some other embodiments, automated markup may also be performed with the suitable techniques and validation will be accordingly provided to ensure the quality of the markup. With the annotated banner images and/or introduction materials (e.g., introduction paragraphs of the messages), a machine learning model can be generated to predict which banner images and/or which introduction material convey what degrees of semantically impactful information to the target customer. For example, at a machine learning stage 919, the machine learning model can determine one or more key emotions and tones associated with the image banners and introduction materials. As a result, the machine learning model is configured to generate a prediction 916 of an effectiveness degree for the banner image and introduction material. In some embodiments, the effectiveness is similarly captured in the afore-described rates (e.g., open rate and conversion rate).

FIG. 9B is another diagram illustrating exemplary aspects associated with content personalization of subject lines, banners and introductory material, consistent with exemplary aspects of certain embodiments of the present disclosure. In this example, an UI 950 is provided to allow for selection of different subject lines for evaluation. In UI 950, a subject line 953 is selected by a message creator. Upon clicking on an "analyze" button 954, the panel 950 is configured to display a determined emotion score/indicator 952 for the selection 953. As shown herein, the subject line 953 is evaluated against all the emotion categories and scored correspondingly under each of such categories. In some embodiments, UI 950 may also be configured to display two additional semantic scores from two other semantic categories. For example, UI 950 may display that "key emotions: excitement (30%), sarcasm (18%), and happiness (17%)," along with an evaluation of "open rate: 34.9%, click rate 1.9%." In comparison, for the same target customer, another subject line 963 may be selected in UI 960 for evaluation. Similarly, UI 960 is configured to display a determined emotion score/indicator 962 for the selection 963. As shown herein, the subject line 963 is evaluated against all the emotion categories and scored correspondingly under each of such categories. In some embodiments, UI 960 may also be configured to display two additional semantic scores from two other semantic categories. For example, UI 960 may display that "key emotions: happiness (27%), excitement (22%), and fear (14%)," along with an evaluation of "open rate: 31.3%, click rate 1.5%."

Figure 10:
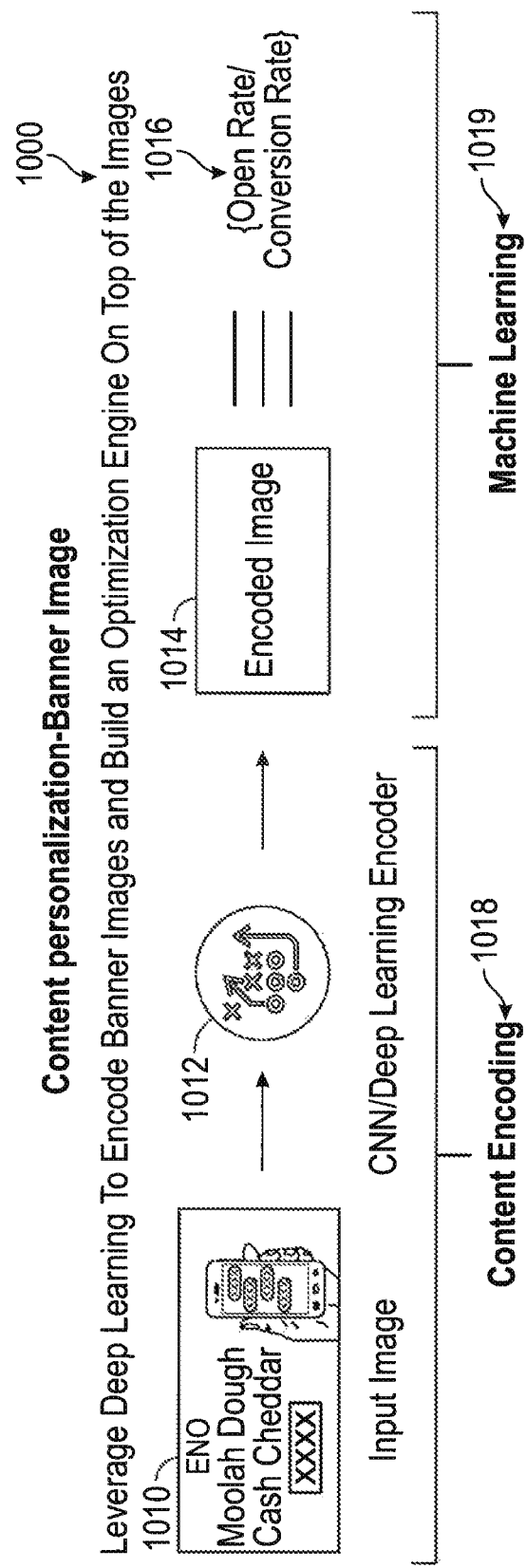
FIG. 10 is a diagram illustrating exemplary aspects of banner images and associated personalization features, consistent with exemplary aspects of certain embodiments of the present disclosure.

FIG. 10 is a diagram illustrating exemplary aspects of banner images and associated personalization features, consistent with exemplary aspects of certain embodiments of the present disclosure. Referring to the example of FIG. 10, a banner image may be personalized via a process involving image encoding and machine learning techniques. In a content encoding stage 1018, for example, historical banner images 1010 of historical communication content can be provided to an encoder tool 1012 for encoding. Further, in a machine learning stage 1019, the encoded banner images can be provided to create and train a machine learning model, which can be used to predict which banner images convey what degrees of semantically impactful information to the target customer. For example, at the machine learning stage 1019, the machine learning model can determine which banner images best suit the message to be transmitted. As a result, the machine learning model is configured to generate a prediction 1016 of an effectiveness degree for the banner image. In some embodiments, the effectiveness is similarly captured in the afore-described rates (e.g., open rate and conversion rate).

Figure 11:
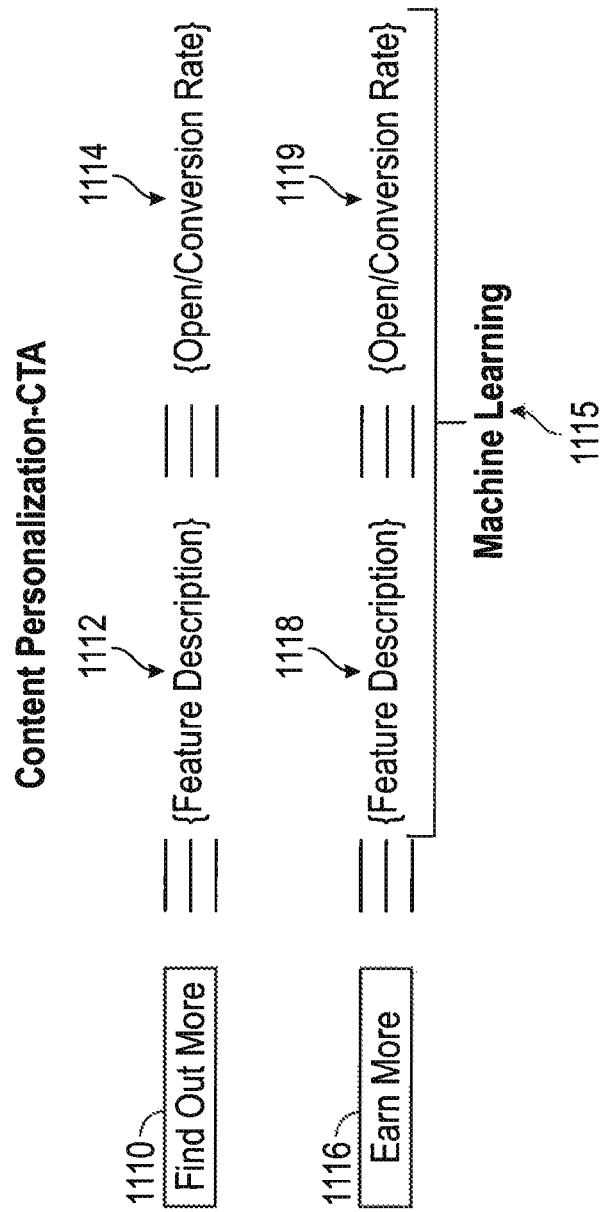
FIG. 11 is a diagram illustrating exemplary aspects of 'call to action' (CTA) messaging and associated personalization features, consistent with exemplary aspects of certain embodiments of the present disclosure.

FIG. 11 is a diagram illustrating exemplary aspects of 'call to action' (CTA) messaging and associated personalization features, consistent with exemplary aspects of certain embodiments of the present disclosure. Referring to the example illustrated in FIG. 11, a CTA item can be personalized by use of feature description and machine learning techniques. In a content input stage 1115, historical CTA items 1010 and 1116 of historical communication content can be annotated with a description 1112 and 1118, respectively, of a set of one or more features that affects the CTA item's effectiveness. In some embodiments, the set of features may include, for example, the position of CTA item in relation to the message and other content items of the message, functionality and persuasiveness associated with the wording/language used in the CTA item, the length of the CTA item, the formatting such as the background color, the text color, the font, the size, the inclusion of emojis, animation, and the like.

In a machine learning stage 1115, the labeled CTA items can be provided to create and train a machine learning model, which can be used to predict which CTA items convey what degrees of semantically impactful information to the target customer. For example, at the machine learning stage 1115, the machine learning model can determine which CTA item best suit the message to be transmitted. As a result, the machine learning model is configured to generate predictions 11114 and 119 of effectiveness degree for CTA items 1110, and 1116, respectively. In some embodiments, the effectiveness is similarly captured in the afore-described rates (e.g., open rate and conversion rate).

Figure 12A:
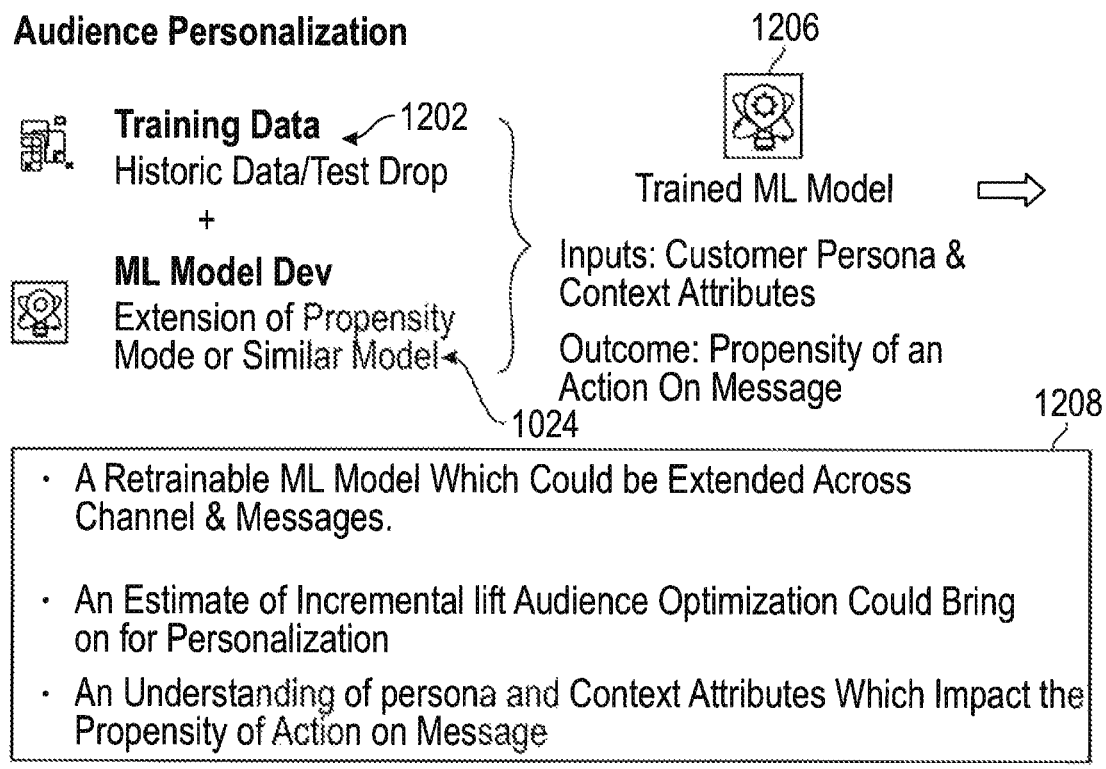
FIGS. 12A-12B are diagrams illustrating exemplary audience personalization features and functionality, consistent with exemplary aspects of certain embodiments of the present disclosure.

FIG. 12A is a diagram illustrating exemplary audience personalization features and functionality, consistent with exemplary aspects of certain embodiments of the present disclosure. In this example, training data 1202 and machine learning models 1024 are provided to generate trained model 1206. For instance, the input data can include historical data and/or testing data related to customer persona attributes and/or customer context attributes. As an outcome, the trained model 1206 produces a propensity model that is configured to predict a likelihood of an action on a message targeting a customer. In some embodiments, such model 1206 is used to generate a set one or more outputs 1208. For example, the model 1206 can be a model that is retrainable with data from different communication channels as well as data related to different historical messages. In other embodiments, the model 1206 predicts an estimated incremental lift audience optimization that can be taken into account for personalization. In some other embodiments, the model 1206 further predicts which ones of persona and context attributes have an impact in terms of the effectiveness of the message.

Figure 12B:
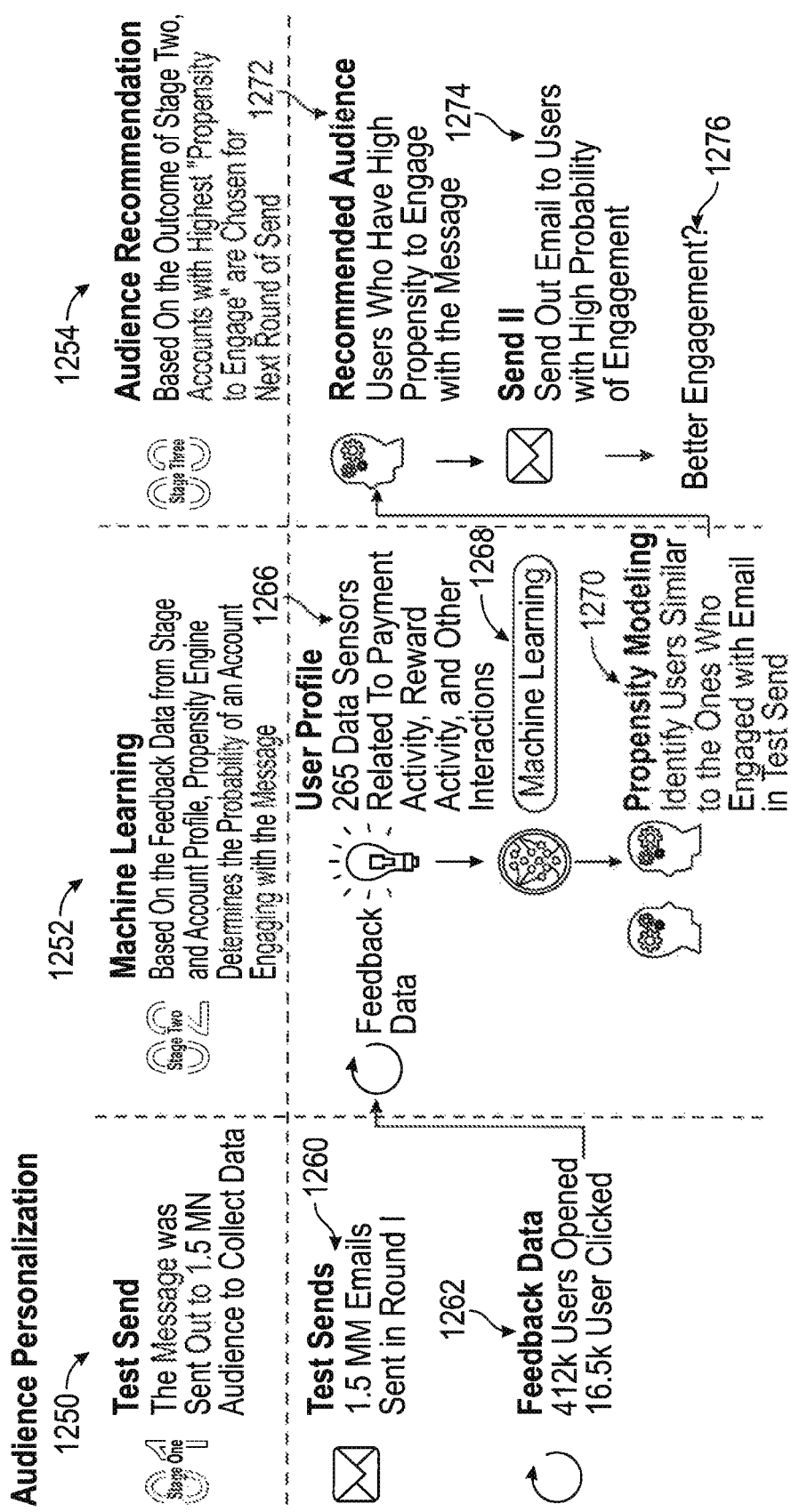

FIG. 12B is another diagram illustrating further exemplary audience personalization features and functionality, consistent with exemplary aspects of certain embodiments of the present disclosure. In this example, audience personalization process starts at 1250, a test stage (e.g., stage one) in which messages are sent to multiple customers at 1260 to collect feedback data at 1262. For example, such data can indicate how many customers have opened the message, and how many customers have clicked through to conversion. Next, at a machine learning stage 1252, based on the feedback data from stage one, as well as profile information 1266 associated with the customers, a propensity prediction engine is generated at 1268 and thereby used to predict the likelihood of a customer being engaged with a message at 1270. In particular, the propensity model can be used to identify other customers who are similar to the ones who have engaged with the message send in stage one. Next, in an audience recommendation stage 1254, based on the outcome of stage two, the customers having the highest likelihood to engage with the message (e.g., the customers identified at 1270) are recommended as the target audience in relation to the message at 1272. Such recommendation can be provided to, for example, a message creator UI 1500 of FIG. 15. With such enhanced knowledge of the audience, the messages are only transmitted to the target audience. At 1276, when further feedback data is available in some embodiment, the propensity model can be validated or tuned for better prediction of effective customer engagement. In some embodiment, the messages can be clustered based on the based on the audience recommendation.

Figure 13:
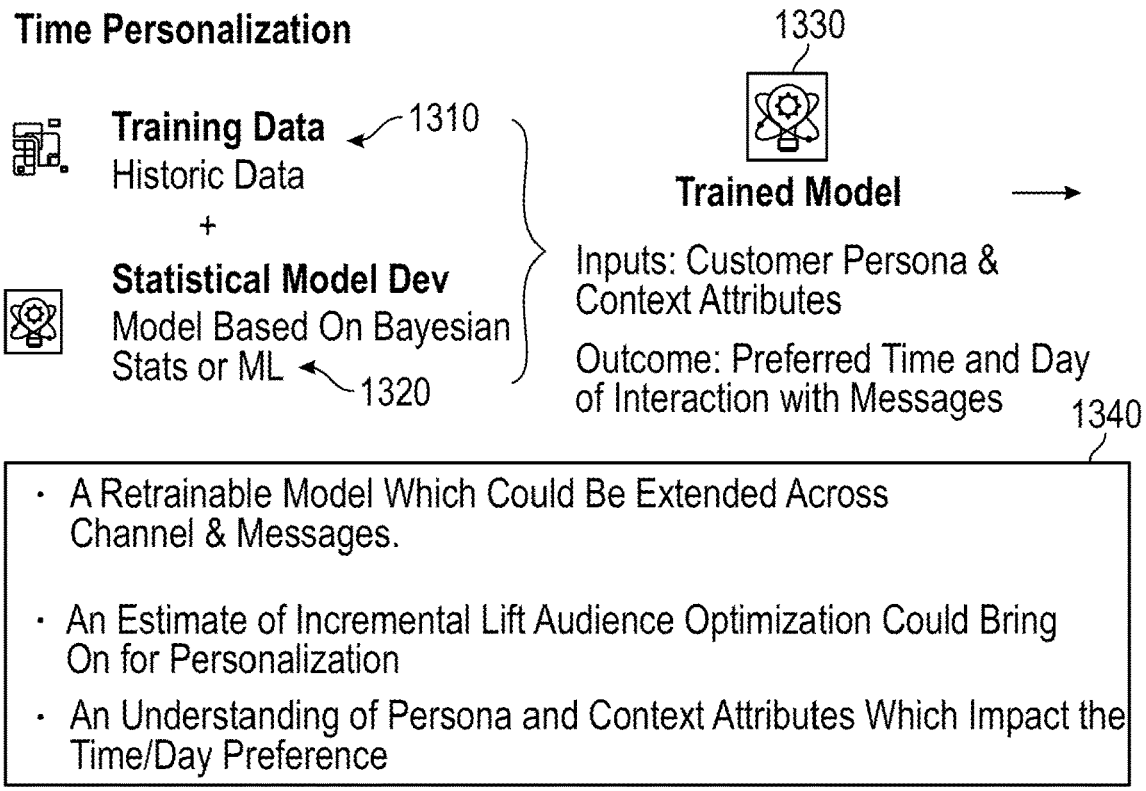
FIG. 13 is a diagram illustrating exemplary time personalization features and functionality, consistent with exemplary aspects of certain embodiments of the present disclosure.

FIG. 13 is a diagram illustrating exemplary time personalization features and functionality, consistent with exemplary aspects of certain embodiments of the present disclosure. In this example, training data 1301 and machine learning models 1320 are provided to generate a trained model 1330. In some embodiments, for example, the input data can include historical data related to customer persona attributes and/or customer context attributes. As an outcome, the trained model 1330 may yield a model that is configured to predict a preferred time/day for likely interaction with a message targeting a customer. In some embodiments, such model 1330 is used to generate a set of one or more outputs 1340. Here, for example, the model 1330 can be a model that is retrainable with data from different communication channels as well as data related to different historical messages. In other embodiments, the model 1330 predicts an estimated incremental lift audience optimization that can be taken into account for personalization. In some other embodiments, the model 1330 further predicts a time/day preference of a customer that incurs an impact on the effectiveness of the message.

Figure 14A:
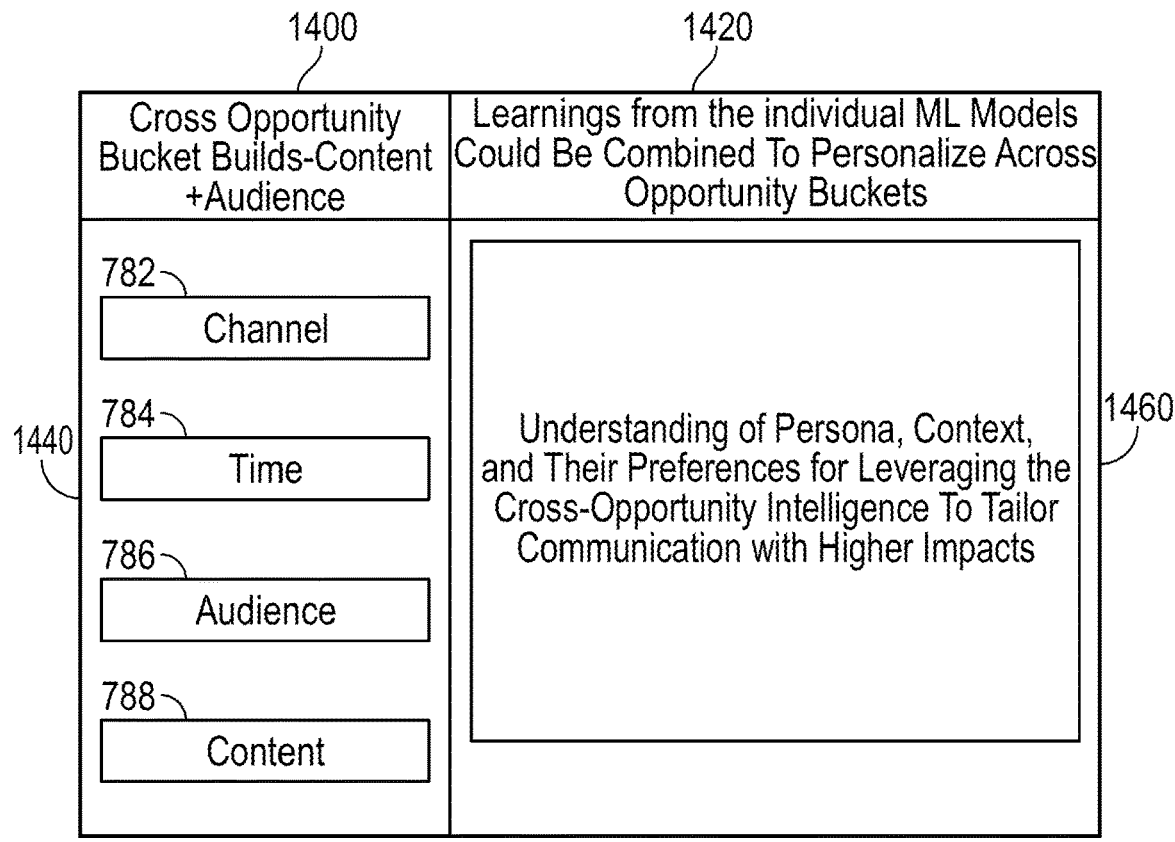
FIG. 14A is a diagram illustrating additional features and functionality associated with personalizing based on channel, time, audience and content, consistent with exemplary aspects of certain embodiments of the present disclosure.

FIG. 14A is a diagram illustrating additional features and functionality associated with personalizing based on channel, time, audience and content, consistent with exemplary aspects of certain embodiments of the present disclosure. In this illustrative implementation, in column 1400, various cross opportunity information of various derivations, e.g., results of machine learning models related to generating channel intelligence 782, time intelligence 784, audience intelligence 786, and content intelligence 788, within 1440, may be combined at 1420 and utilized to generate cross-opportunity intelligence of greater effectiveness. For example, leveraging the totality of an understanding of persona, context, and preferences can generate cross-opportunity intelligence to further tailor communications with customers having higher impact, at 1460.

Figure 14B:
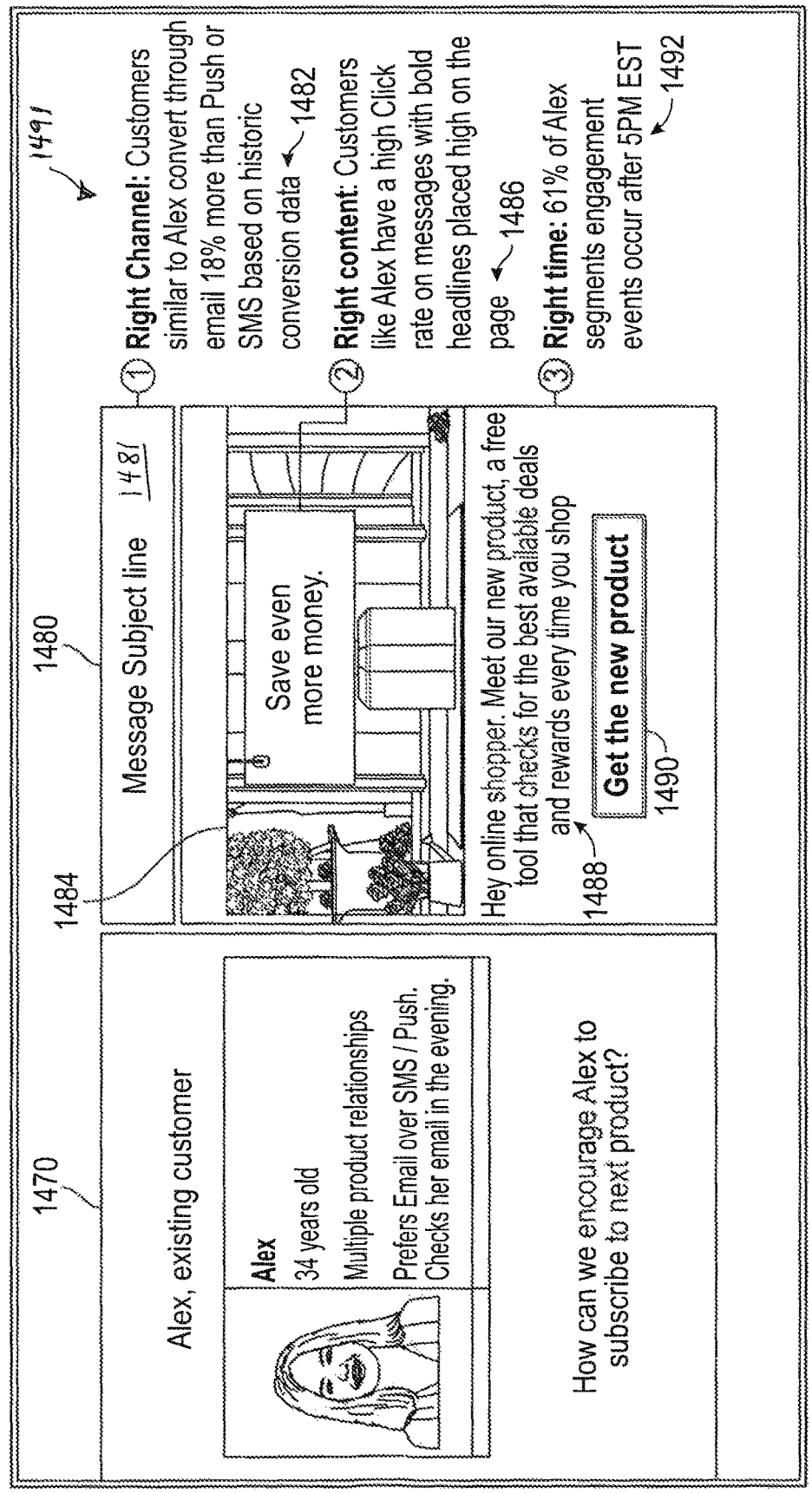
FIG. 14B is a graphical user interface illustrating exemplary message personalization features and functionality, consistent with exemplary aspects of certain embodiments of the present disclosure.

FIG. 14B is a representation of a graphical user interface depicting illustrative message personalization features and functionality, consistent with exemplary aspects of certain embodiments of the present disclosure. Referring to FIG. 14B, a graphical user interface (GUI) 1465 may be utilized as a message creation portal involving channel, time, audience and content features and functionality, such as those that are implemented by a service provider agent, e.g., line-of-business (LOB) agent, to develop and/or create intelligent messages for transmission to a selected user or group. In some embodiments, GUI 1465 may be implemented at the communication application 109 of FIG. 1.

Referring to FIG. 14B, exemplary GUI 1465 is comprised of three regions: a left-side panel 1470, a middle panel 1480, and right-side field containing comments related to the results and/or intelligence generated by the machine learning. In the exemplary embodiment shown, the GUI 1465 may be configured to display in the left-side panel 1470 information regarding the audience of interest for developing high-impact communications. Here, for example, an existing customer, Alex, has been selected and is displayed as the target audience. In connection with various biographic data, additional information regarding the target customer may also be displayed, such as, here in this one simplified and illustrative example, that Alex has multiple product relationships with the service provider, that she prefers to be contacted via emails versus SMSs or push communications, and that she tends to check her emails in the evenings.

A middle panel 1480 of exemplary GUI 1465 may comprise a subject line area 1481, a content field 1484 that may contain headline text and graphical/image information, a text field 1488 that may contain a detailed textual description of the content, and a CTA (call to action) such as a button or other UI element 1490 that provides the recipient an opportunity to take an action consistent with the content and an associated action being advanced.

In FIG. 14B, the right-side field 1491 comprises comments describing the results and/or intelligence generated by the machine learning models related to generating the channel intelligence 782, the content intelligence 788, and the time intelligence 784 of the middle panel 1480. The audience intelligence output is displayed and described in the left side panel 1470. At 1482, a comment is provided describing a 'right' (i.e., good or best) channel that has been selected, i.e., a communication channel where it's been determined that customers similar to Alex have a highest tendency to convert (take action); here, for example, email has an 18% greater propensity to elicit a response from Alex, versus a push communications or SMS messages, based perhaps on historic conversion data. At 1486, a comment is provided indicating that the particular headline text and graphical information being displayed have been selected based on the fact that customers like Alex have a high click rate on messages with bold headlines placed high on the page. At 1492, another comment is provided indicating that the 'right' timing has been selected; here, for example, sent at a time when Alex engages with 61% of the emails she receives at that time, e.g., emails received after 5 pm EST. Accordingly, as see in this and the following examples, the disclosed technology herein may provide substantial technical improvements with features and functionality involved with technical delivery aspects, thereby yielding greater acceptance of tailored communications to increase impact and results.

For example, subject line personalization annotation 1552 is displayed to indicate that, based on the engine's knowledge of Alex, a casual tone is used to match with Alex's preference. Audience prediction annotation 1554 is displayed to indicate that Alex is highly likely to respond to the "go paperless" service offered in the message. In some embodiments, Alex is pre-selected in a cluster of customers who are identified as those of high propensity for going paperless. In other embodiments, Alex is selected by the agent, and the engine confirms that Alex is the right type of audience for this type of message via annotation 1554. Emotion predictor annotation 1556 is displayed to indicate that "excitement" is themed in the headline, based on the past messaging performance. Time intelligence predictor annotation 1558 is displayed to indicate that the message should be transmitted in the evening, since according to the engine's knowledge, Alex usually reads her emails. CTA intelligence/emotion intelligence predictor annotation 1559 is displayed to indicate that a tone of "candor" be used in order to engage Alex to click on the action button to accept the offer.

Figure 15:
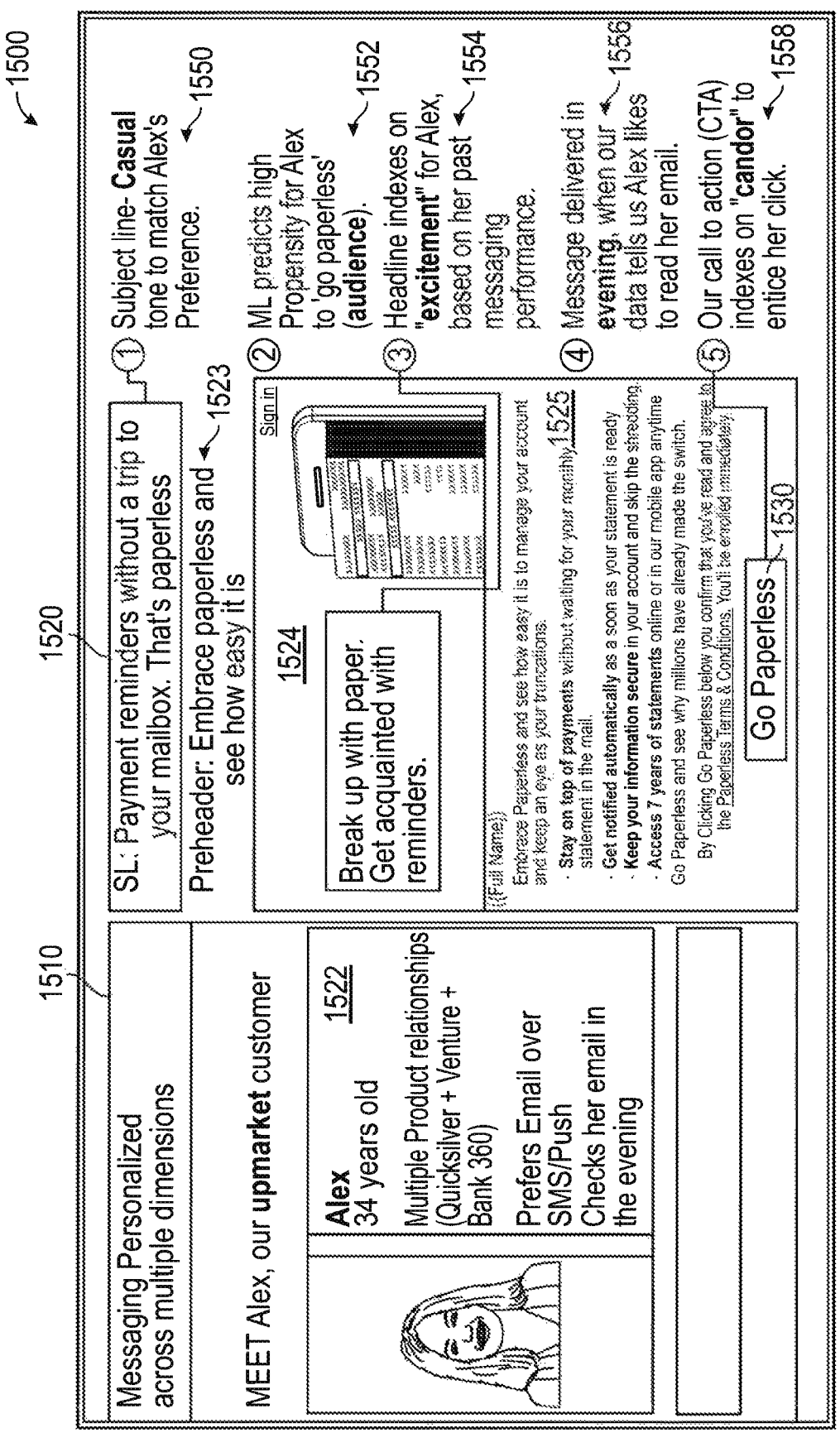
FIG. 15 is a graphical user interface illustrating exemplary message personalization features and functionality, consistent with exemplary aspects of certain embodiments of the present disclosure.

FIG. 15 is a graphical user interface illustrating exemplary message personalization features and functionality, consistent with exemplary aspects of certain embodiments of the present disclosure. A graphical user interface (UI) 1500 may be implemented as a message creator with which a service provider agent, e.g., line-of-business (LOB) agent, interacts to verify, and/or create intelligent messages for transmission to a selected user or a group of selected users. In some embodiments, UI 1500 can be implemented at the communication application 109 of FIG. 1.

Referring to FIG. 15, UI 1500 includes three panels: a left-hand panel 1510, a mid-panel 1520, and a right-hand panel 1550. At this stage, the LOB agent has selected customer "Alex" as the target audience and thereby navigate to UI 1500. As such, at left-hand panel 1510, a textual line of "Meet Alex, our upmarket customer" is displayed, along with other information about customer Alex. With the identification of a customer, the customer information corresponding to Alex is retrieved. For example, as illustrated herein, a photo of Alex is displayed, a brief prolife of Alex is also displayed to provide the LOB agent with a quick glance about the system knowledge on Alex. For instance, Alex is 34 years old, she has already purchased multiple products and therefore in a multi-product relationship with the provider. It is also shown that Alex prefers to be contacted via emails than other communication channel such as SMS, or other push messaging. It is also displayed that Alex usually reads her emails in the evening.

In the mid-panel 1520, a subject line area 1521, a headline area 1524, a message body area 1525, and a CTA item 1530 are organized and displayed to emulate the look-and-feel of a message to be presented to a customer. The subject line area 1521 is configured to display a subject line recommended by the content recommendation engine. Underneath, a headline area 1521 is configured to display a headline recommended by the content recommendation engine. An image banner 1523 is also included as part of the headline. The message body area 1525 is configured to display the message body text recommended by the content recommendation engine. At the bottom of the mid-panel 1520, the CTA item 1530 is configured as an item having an emotional index recommended by the content recommendation engine.

In the right-hand panel 1550, a plurality of annotation for the content recommendation recommended in mid-panel 1520 is displayed. For example, subject line personalization annotation 1552 is displayed to indicate that, based on the engine's knowledge of Alex, a casual tone is used to match with Alex's preference. Audience prediction annotation 1554 is displayed to indicate that Alex is highly likely to respond to the "go paperless" service offered in the message. In some embodiments, Alex is pre-selected in a cluster of customers who are identified as those of high propensity for going paperless. In other embodiments, Alex is selected by the agent, and the engine confirms that Alex is the right type of audience for this type of message via annotation 1554. Emotion predictor annotation 1556 is displayed to indicate that "excitement" is themed in the headline, based on the past messaging performance. Time intelligence predictor annotation 1558 is displayed to indicate that the message should be transmitted in the evening, since according to the engine's knowledge, Alex usually reads her emails. CTA intelligence/emotion intelligence predictor annotation 1559 is displayed to indicate that a tone of "candor" be used in order to engage Alex to click on the action button to accept the offer.

In some embodiments, text in different parts of the message (e.g., subject line, preheader, body, etc.), and CTA choices can be further modified by the agent in addition to the intelligent messages generated by the content recommendation engine. For example, based on personal information regarding Alex from previous communication and/or information for similar customers, the agent may change the image banner to an animated icon to further engage Alex's attention to the service offered in the message.

Other UI elements such as a button to confirm the adoption of the intelligent message auto-generated by the content recommendation engine, a button to preview the finalized message, and/or UI to configure the transmission of the message to a customer (Alex) at a specified channel and time are not shown herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device)

occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
    receiving, by at least one computer, first data comprising content preferences associated with an audience;
    receiving, by the at least one computer, second data comprising an initial digital message being proposed for transmission to the audience;
    generating, by the at least one computer, a recommendation data set based at least in part on the first data and the second data, wherein the recommendation data set identifies at least one recommended content type and at least one recommended message type;
    determining, by the at least one computer, via a natural language generation (NLG) machine learning model, suggested content for the audience, by:
        analyzing a repository of content messages associated with a plurality of sentiments based at least in part on the recommended data set to identify one or more correlations between the recommended data set and one or more content messages, the repository of content messages are categorized into a plurality of message sentiment categories, based on scored conversion events associated with the plurality of sentiments; and
        generating the suggested content based on the one or more correlations, wherein the suggested content comprises one or more suggested content messages having one or both of a suggested message type and a suggested message language; and providing, by the at least one computer, via an application program interface (API), the suggested content for dissemination to the audience.

Clause 2. The method of clause 1 wherein the first data is generated via the at least one computer passing inputs to and retrieving outputs from a content preference predictor engine that provides the content preferences predicted to be of interest to an audience.

Clause 3. The method of clause 1 wherein the suggested content is generated via passing inputs to and retrieving outputs from a sentiment analyzer that analyzes prior communications associated with the audience and determines sentiments that yield conversion events associated with respective communications to or from the audience.

Clause 4. The method of clause 1 wherein the suggested content comprises one or both of: a determination as to whether an item of content will have an expected impact, and a recommendation (e.g., to the user, etc.), the recommendation being based at least in part on the suggested content determined.

Clause 5. The method of clause 2 or clause 3 wherein one or both of input(s) to the content preference predictor engine and input(s) to the sentiment analyzer comprise communications with customers.

Clause 6. The method of clause 2 or clause 3 wherein the outputs from the content preference predictor engine comprises one or more of: a level of likelihood of engagement with the content to disseminate, a likely time to access the content to disseminate, and a type of communication channel at which to access the content to disseminate, and a likely sentimental preference in communication.

Clause 7. The method of clause 3 wherein the outputs from the sentiment analyzer comprises an impactful semantic category for a target audience.

Clause 8. The method of clause 7, wherein the impactful semantic category is selected from a plurality of categories comprising three or more of: a sentiment category, an emotion category, a perceived message type category, a semantic relatedness category, a feeling category, a tone category, a perception category, a micro structure category, and an emotional intelligence category, and wherein the sentiment category is comprised of 2 or more subcategories selected from positive, neutral, and negative.

Clause 9. The method of clause 8 wherein the emotion category is comprised of 3 or more, or 4 or more, or 5 or more, subcategories selected from a group composed of boredom, anger, excitement, sadness, fear, joy, trust, pride, anticipation, anxiety, safety, urgency, luck, guilt, exclusivity, fascination, achievement, gratification, encouragement, intimacy, curiosity, gratitude, and challenge.

Clause 10. The method of clause 1, wherein the repository of content messages is generated based on:
    categorizing communication content into categories of elements; and
    tagging each categorized element with a set of one or more metadata.

Clause 11. The method of clause 10, wherein one or both of:
    the categories of elements comprise: a subject line, a preheader, a banner image, an introductory section, a call to action, a preheader, a body section, a value proposition, and an end section; and
    the metadata comprises one or more dimensions on emotions, intent, and sentiments.

Clause 12. The method of clause 1, wherein the NLG machine learning model is configured to score an element of content based on a category associated therewith and the repository of content messages.

Clause 13. The method of clause 1, wherein the NLG machine learning model one or both of:
    comprises a cross opportunity machine learning model; and
    is trained with historical data and/or feedback data.

Clause 14. The method of clause 1, wherein the machine learning model is trained with user profile data, the user profile data comprising historical user data related to one or more of: payment activity, reward activity, and response to promotional offers.

Clause 15. The method of clause 1, wherein the suggested content comprises image content, the image content comprising information regarding one or more of: emotional content, formatting content, and imagery content.

Clause 16. The method of clause 1 wherein the suggested content comprises a set of one or more call to action (CTA) attributes, a CTA attribute corresponding to one of the following: a position parameter, a functional parameter, a length parameter, a degree of urgency of action parameter, an indicator of direct call-out parameter, and a formatting parameter.

Clause 17. The method of clause 16 wherein the formatting parameter comprises at least one of: a color parameter, a font parameter, an Emoji parameter.

Clause 18. The method of clause 1 wherein the suggested content comprises one or more of: subject line content, and preheader content, the subject line content comprising information regarding one or more of: emotional content, subject line sentence/phrase structure, subject line tone, and subject line addressee.

Clause 19. The method of clause 1 wherein the suggested content comprises body content, the body content comprising information regarding one or more of: introductory content, emotional content, ending content, main message content, and formatting content.

Clause 20. The method of clause 1 wherein the suggested content comprises a first portion of personalized content that corresponds to the message sentiment category determined to be impactful to the audience, a second portion of personalized content that corresponds to the emotion category determined to be impactful to the audience, and a third portion of personalized content that corresponds to the perceived message type category determined to be impactful to the audience.

Clause 20. Embodiments herein may also take the form of a system comprised of computing elements that are arranged, programmed and/or otherwise adapted to perform the features and functionality set forth anywhere above.

Clause 21. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
   training, by at least one computer, a natural language generation (NLG) machine learning model on customer data derived from a plurality of customers, the customer data comprising content types, audiences, message types, and conversion rates associated with messages previously transmitted to the plurality of customers;
   receiving, by the at least one computer, first data comprising content preferences associated with an audience that comprises a subset of the plurality of customers, the content preferences comprising a likelihood of engagement with content types and a likelihood of engagement with message types;
   receiving, by the at least one computer, initial message data comprising an initial digital message being proposed for transmission to the audience;
   generating, by the at least one computer, a recommendation data set based at least in part on the content preferences and the initial message data, wherein the recommendation data set identifies at least one recommended content type and at least one recommended message type;
   identifying, by the at least one computer, a repository of content messages that comprises a plurality of content messages, wherein the messages in the repository of content messages are categorized into a plurality of message sentiment categories based on scored conversion events associated with the plurality of sentiments;
   analyzing, by the at least one computer, via the NLG machine learning model, the repository of content messages based at least in part on the recommendation data set to map the content preferences of the audience to content messages based on one or more correlations between the recommendation data set and one or more content messages in the repository of content messages;
   generating, by the at least one computer, via the NLG machine learning model and using content messages identified in the analysis that correlate with the recommendation data set as inputs to the NLG machine learning model, a tailored digital message that comprises one or more suggested content messages having one or both of a suggested message type and a suggested message language;
   providing, by the at least one computer, via an application program interface (API), the tailored digital message to at least one computing device for transmission to the audience; and repeating, by the at least one computer, training of the NLG machine learning model based on feedback data relating to customer engagement with the tailored digital message.

2. The method of claim 1 wherein the suggested content is generated via passing inputs to and retrieving outputs from a sentiment analyzer that analyzes prior communications associated with the audience and determines sentiments that yield conversion events associated with respective communications to or from the audience.

3. The method of claim 2 wherein an input to the sentiment analyzer comprises communications with customers.

4. The method of claim 1 wherein the suggested content comprises one or both of: a determination as to whether an item of content will have an expected impact, and a recommendation to the audience based at least in part on the suggested content determined.

5. The method of claim 2 or claim 4 wherein the outputs from the content preference predictor engine comprises one or more of: a level of likelihood of engagement with the content to disseminate, a likely time to access the content to disseminate, and a type of communication channel at which to access the content to disseminate, and a likely sentimental preference in communication.

6. The method of claim 1, wherein generating the tailored digital message comprises selecting an impactful semantic category from a plurality of categories comprising three or more of: a sentiment category, an emotion category, a perceived message type category, a semantic relatedness category, a feeling category, a tone category, a perception category, a micro structure category, and an emotional intelligence category, and wherein the sentiment category is comprised of 2 or more subcategories selected from positive, neutral, and negative.

7. The method of claim 6 wherein the emotion category is comprised of 3 or more subcategories selected from a group composed of boredom, anger, excitement, sadness, fear, joy, trust, pride, anticipation, anxiety, safety, urgency, luck, guilt, exclusivity, fascination, achievement, gratification, encouragement, intimacy, curiosity, gratitude, and challenge.

8. The method of claim 1, wherein the repository of content messages is generated based on:
categorizing communication content into categories of elements; and
tagging each categorized element with a set of one or more metadata.

9. The method of claim 8, wherein one or both of:
the categories of elements comprise: a subject line, a preheader, a banner image, an introductory section, a call to action, a preheader, a body section, a value proposition, and an end section; and
the metadata comprises one or more dimensions on emotions, intent, and sentiments.

10. The method of claim 1, wherein the NLG machine learning model is configured to score an element of content based on a category associated therewith and the repository of content messages.

11. The method of claim 1, wherein the NLG machine learning model comprises a cross opportunity machine learning model that generates cross opportunity intelligence information derived based on results of a plurality of machine learning models that provide channel intelligence information, time intelligence information, audience intelligence information, and content intelligence information; and
wherein the method further comprises:
performing, by the at least one computer, an audience personalization process including:
a first test stage comprising:
sending a test version of the initial digital message to a subset of the audience; and
collecting feedback data regarding reactions of subset of the audience-including how many members of the subset opened the message and how many members of the subset clicked through to conversion;
a second machine learning stage comprising:
training the NLG machine learning model the feedback data and user profile data;
generating a propensity prediction engine as a function of the training based on the feedback data;
predicting, by the propensity prediction engine, a likelihood of a member of the audience being engaged with a message; and
identifying additional members of the audience who are similar to the members of the subset of the audience who have engaged with the test version of the initial digital message sent in the first test;
a third audience recommendation stage comprising:
selecting, based on the additional members identified in stage two, an additional audience comprising a subset of users who have a higher propensity to engage with the initial digital message; and
sending the initial digital message to the recommended audience.

12. The method of claim 11, wherein the time intelligence information is derived via:
providing training data and statistical machine learning models based on Bayesian statistics or machine learning to generate a trained time intelligence model, wherein the training data includes historical data related to customer persona attributes and customer context attributes;
generating, by the trained time intelligence model, one or more outputs including a preferred time/day for likely interaction with a message targeting a customer.

13. The method of claim 12, wherein the trained time intelligence model is a model that is retrainable with data from different communication channels as well as data related to different historical messages; and
wherein the one or more outputs include: (i) an estimated incremental lift audience optimization that is taken into account for personalization; and/or (ii) a time/day preference of a customer that incurs an impact on the effectiveness of the message.

14. The method of claim 11, wherein the NLG machine learning model is trained with the user profile data comprising historical user data related to one or more of: payment activity, reward activity, and response to promotional offers.

15. The method of claim 1, wherein the suggested content comprises image content, the image content comprising information regarding one or more of: emotional content, formatting content, and imagery content.

16. The method of claim 1 wherein the suggested content comprises a set of one or more call to action (CTA) attributes, a CTA attribute corresponding to one of the following: a position parameter, a functional parameter, a length parameter, a degree of urgency of action parameter, an indicator of direct call-out parameter, and a formatting parameter.

17. The method of claim 16 wherein the formatting parameter comprises at least one of: a color parameter, a font parameter, an Emoji parameter.

18. The method of claim 1 wherein the suggested content comprises one or more of: subject line content, and preheader content, the subject line content comprising information regarding one or more of: emotional content, subject line sentence/phrase structure, subject line tone, and subject line addressee.

19. The method of claim 1 wherein the suggested content comprises body content, the body content comprising information regarding one or more of: introductory content, emotional content, ending content, main message content, and formatting content.

20. The method of claim 1 wherein the suggested content comprises a first portion of personalized content that corresponds to the message sentiment category determined to be impactful to the audience, a second portion of personalized content that corresponds to an emotion category determined to be impactful to the audience, and a third portion of personalized content that corresponds to a perceived message type category determined to be impactful to the audience.

* * * * *